US012550909B2

(12) United States Patent
Ren et al.

(10) Patent No.: US 12,550,909 B2
(45) Date of Patent: Feb. 17, 2026

(54) STORAGE APPARATUS

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Zhijie Ren, Hefei (CN); Min Fang, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 657 days.

(21) Appl. No.: 18/008,969

(22) PCT Filed: Dec. 16, 2020

(86) PCT No.: PCT/CN2020/136970
§ 371 (c)(1),
(2) Date: Dec. 8, 2022

(87) PCT Pub. No.: WO2022/126454
PCT Pub. Date: Jun. 23, 2022

(65) Prior Publication Data
US 2023/0225342 A1    Jul. 20, 2023

(51) Int. Cl.
*A23B 7/015*    (2006.01)
*A47B 71/00*    (2006.01)

(52) U.S. Cl.
CPC ............. *A23B 7/015* (2013.01); *A47B 71/00* (2013.01); *A23V 2300/12* (2013.01)

(58) Field of Classification Search
CPC .................................. A23B 7/015; A47B 71/00
See application file for complete search history.

(56) References Cited

U.S. PATENT DOCUMENTS

2010/0222533 A1*  9/2010  Knorr ................ B01D 39/1692
                                                                      528/370

FOREIGN PATENT DOCUMENTS

| CN | 202504699 U | 10/2012 |
| CN | 102887288 A | 1/2013 |
| CN | 202807460 U | 3/2013 |
| CN | 204816887 U | 12/2015 |
| CN | 204994549 U | 1/2016 |

(Continued)

OTHER PUBLICATIONS

CN 106026758 translation (Year: 2016).*

(Continued)

*Primary Examiner* — Woody A Lee, Jr.
(74) *Attorney, Agent, or Firm* — K&L Gates LLP

(57) ABSTRACT

A storage apparatus, comprising a compartment; and a box assembly, which is arranged in the compartment. The box assembly comprises: a first side wall; a second side wall arranged opposite the first side wall; a first conductive layer arranged on the second side wall; a first electret membrane, which is arranged on the first side wall, located between the first side wall and the first conductive layer and arranged parallel to the first conductive layer; and an adjusting component, which is used for adjusting the electric field intensity between the first conductive layer and the first electret membrane.

10 Claims, 8 Drawing Sheets

(56) References Cited

FOREIGN PATENT DOCUMENTS

| CN | 106026758 | A | * | 10/2016 | ............... H02N 1/04 |
|----|-----------|---|---|---------|---------------------------|
| CN | 108418473 | A |   | 8/2018  |                           |
| CN | 108534434 | A | * | 9/2018  | ............. A23B 7/015  |
| CN | 108592484 | A |   | 9/2018  |                           |
| CN | 209345983 | U |   | 9/2019  |                           |
| CN | 108166158 | B | * | 6/2020  | ............. D04H 1/541  |
| EP | 3330986   | A1| * | 6/2018  | ............. H01G 7/028  |
| JP | H01274846 | A |   | 11/1989 |                           |
| WO | 2019214092| A1|   | 11/2019 |                           |

OTHER PUBLICATIONS

ISR mailed Sep. 15, 2021 for PCT Application No. PCT/CN2020/136970.
Supplementary European Search Report of EP App No. 20965472.2, mailed Aug. 1, 2023.

* cited by examiner

STORAGE APPARATUS

CROSS-REFERENCES TO RELATED APPLICATIONS

The present disclosure is a national phase application of International Application No. PCT/CN2020/136970, filed on Dec. 16, 2020, the entireties of which are herein incorporated by reference

FIELD

The present disclosure relates to the field of refrigeration apparatuses, and more particularly, to a storage apparatus.

BACKGROUND

In the related art, studies on home appliances with storage functions such as refrigerators have shown that placing foods (fruits and vegetables, etc.) in an electrostatic field can effectively improve the shelf life and reduce the rate of spoilage. To form an electrostatic field, it is necessary to provide an energized electrode in a refrigerator compartment and arrange a power supply line, a voltage regulator, and the like, which is costly.

SUMMARY

It is an object of the present disclosure to solve at least one of the technical problems existing in the prior art or related art.

To this end, in a first aspect of the present disclosure, a storage apparatus is provided.

In view of this, in the first aspect of the present disclosure, a storage apparatus is provided and includes: a compartment; a box assembly provided in the compartment, and the box assembly includes a first side wall and a second side wall, the second side wall being arranged opposite the first side wall; a first conductive layer provided on the second side wall; a first electret membrane provided on the first side wall, and the first electret membrane is between the first side wall and the first conductive layer and is in parallel with the first conductive layer; and an adjusting component for adjusting an intensity of an electric field between the first conductive layer and the first electret membrane.

In this embodiment, the storage apparatus can be a refrigerator, a freezer, or a cold storage containing a compartment. The compartment is kept at a constant and low temperature as set by a user to preserve the quality and freshness of materials.

A box assembly is provided in the compartment, and the distance between the first side wall and the second side wall of the box assembly can be adjusted by the adjusting component, that is, the adjusting component moves the first side wall closer to the second side wall to render a smaller air gap between the first side wall and the second side wall. In some embodiment, the adjusting component moves the first side wall farther from the second side wall to render a larger air gap between the first side wall and the second side wall.

Herein, the first side wall is provided with the first electret membrane, the second side wall is provided with the first conductive layer, and an electrostatic field can be generated between the first electret membrane and the first conductive layer.

In an embodiment, the electret is a dielectric material capable of long-term storage of electric charges. Therefore, the metal electrode is provided on one side of the electret material matrix, and the metal electrode is electrically polarized under the influence of the charges of the electret, and an electrode is formed without an external power source. Accordingly, the electrodes formed by the electret membrane may affect the distribution of charges in the first conductive layer, for electrically poling the first conductive layer as well. As such, an electrostatic field is generated between the first electret membrane and the first conductive layer.

The intensity of the electrostatic field is related to the distance between the first electret membrane and the first conductive layer. In an embodiment, when the distance between the first side wall and the second side wall decreases, the distance between the first electret membrane and the first conductive layer correspondingly decreases, and at this time, the intensity of the electrostatic field inside the box assembly increases; in an intensified electrostatic field, the cell membrane of bacteria may show perforation polarization, and then suffer irreversible damage, resulting in the inactivation of bacteria. The box assembly can thus be used as a sterilization apparatus.

As the distance between the first side wall and the second side wall increases, the electrostatic field intensity decreases, and the storage space between the first side wall and the second side wall expands. At this time, an electrostatic field with quite enough intensity is still maintained in the box assembly, and in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

In the embodiment herein, the adjusting component is provided to adjust the distance between the first side wall and the second side wall in the box assembly and the box assembly can serve as a sterilization apparatus or a fresh-keeping apparatus. A user can adjust the working mode of the box assembly depending on actual requirements, catering to various requirements of the user, and accordingly, the storage apparatus has more function modes without additional function modules, for improving the user experience of the storage apparatus.

In the above embodiment, the box assembly further includes a second conductive layer provided on the first side wall and between the first side wall and the first electret membrane.

In this embodiment, the box assembly further includes the second conductive layer provided on the first side wall, and the second conductive layer is in parallel with the first conductive layer, that is, opposite electrical shielding layers are formed by the second conductive layer in combination with the first conductive layer, and the electrostatic field generated by the electret membrane is limited in a direction from the first side wall to the second side wall.

Taking the first side wall as a top wall and the second side wall as a bottom wall as an example, since the top wall and the bottom wall are respectively provided with the first conductive layer and the second conductive layer that are arranged opposite and parallel to each other, the electrostatic field can be limited in a vertical direction from the first side wall to the second side wall, i.e., between the top wall and the bottom wall. With the electrostatic field limited in one direction, a situation where electrostatic fields in multiple directions cancel each other is avoided, which is conducive to improving the intensity of the electrostatic field and rendering a better fresh-keeping effect of storing food or a better sterilization effect of the sterilization apparatus.

In any of the above embodiments, the box assembly further includes a second electret membrane provided on the first conductive layer, and the second electret membrane is in parallel with the first electret membrane, and the charge polarity of the second electret membrane is opposite to the charge polarity of the first electret membrane.

In this embodiment, the second electret membrane may further be provided in the box assembly, and the second electret membrane may be on the second side wall, opposite and in parallel with the first electret membrane. Herein, the charge polarity of the second electret membrane is opposite to the charge polarity of the first electret membrane, that is, when the second electret membrane is positively charged, the first electret membrane is negatively charged; when the second electret membrane is negatively charged, the first electret membrane is positively charged.

In the embodiment herein, the second electret membrane in parallel with the first electret membrane, and the charge polarity of the second electret membrane is opposite to the charge polarity of the first electret membrane, and thus the intensity of the electrostatic field is effectively increased, for improving the fresh-keeping effect of the box assembly to store food or the sterilization effect of the sterilization apparatus.

In any of the above embodiments, the storage apparatus includes a first ground line through which the first conductive layer is grounded, and a second ground line through which the second conductive layer is grounded.

In this embodiment, the first ground line and the second ground line are provided in the storage apparatus. The first ground line is connected to the first conductive layer and the first conductive layer is grounded. Similarly, the second ground line is connected to the second conductive layer and the second conductive layer is grounded. With the first conductive layer and the second conductive layer grounded, the first conductive layer and the second conductive layer have equal potentials, which can ensure that the electrostatic field generated by the electret membrane is limited in a fixed direction, advantageous for improving the intensity of the electrostatic field and rendering a better fresh-keeping effect of storing food.

In some embodiments, the first ground line is in communication with the second ground line, that is, the first conductive layer and the second conductive layer are commonly grounded, which can further increase the intensity of the electrostatic field.

In other embodiments, the first ground line and the second ground line are connected to a ground line of the refrigerator or a shell of the refrigerator.

In any of the above embodiments, the adjusting component includes a first connecting portion connected to the first side wall, a second connecting portion connected to the second side wall, and a drive member for driving the first connecting portion to move relative to the second connecting portion to move the first side wall closer to or away from the second side wall.

In this embodiment, the adjusting component includes the first connecting portion and the second connecting portion, and the first connecting portion is connected to the first side wall, and the second connecting portion is connected to the second side wall.

In an embodiment, in the box assembly, both the first side wall and the second side wall are configured to be movable. The box assembly may include five side walls, and the first side wall and the second side wall are arranger opposite to each other. As can be appreciated, the box assembly can further include fewer side walls, and in the case that the box assembly includes only the first side wall and the second side wall, the first side wall and the second side wall can optionally be top and bottom walls that sandwich something therebetween.

The first side wall and the second side wall are connected to the first connecting portion and the second connecting portion, respectively, and the first side wall can be fixedly connected to the first connecting portion by welding, adhesion or integral forming, or can be detachably connected to the first connecting portion by bolts, snaps, etc.

The drive member may be a direct current motor, and a gear is provided at an output end of the direct current motor, and the gear drives a rack to move, for driving the first side wall and the second side wall to move closer to or away from each other.

The drive member may also be a linear motor having a driving end directly connected to one of the first and second connecting portions, for directly driving the first and second side walls to move closer to or away from each other.

In the embodiment herein, the first connecting portion and the second connecting portion are driven by the drive member, for changing the distance between the first side wall and the second side wall, and the box assembly can serve as a sterilization apparatus or a fresh-keeping apparatus. A user can adjust the working mode of the box assembly depending on actual requirements, catering to various requirements of the user, and accordingly, the storage apparatus has more function modes without additional function modules, for improving the user experience of the storage apparatus.

In any of the above embodiments, the storage apparatus further includes a controller connected to the drive member, and the controller is configured to control the first connecting portion to move relative to the second connecting portion to bring the first conductive layer closer to the second conductive layer in response to a sterilizing instruction, and control the first connecting portion to move relative to the second connecting portion to bring the first conductive layer away from the second conductive layer in response to a fresh-keeping instruction, for forming a receiving cavity between the first conductive layer and the second conductive layer.

In this embodiment, upon the reception of the sterilizing instruction, the drive member is controlled to drive the first connecting portion to move towards the second connecting portion, and the air gap between the first conductive layer and the second conductive layer gets smaller, and the box assembly enters the sterilization mode.

Upon the reception of the fresh-keeping instruction, the drive member is controlled to drive the first connecting portion to move away from the second connecting portion, and the air gap between the first conductive layer and the second conductive layer gets larger, and the box assembly enters the fresh-keeping mode.

In an embodiment, assuming that the thickness of the electret membrane is s and the charges are distributed on the surface of the electret membrane with a density $\sigma$, the first conductive layer and the second conductive layer have induced charges on their surfaces under the influence of the electret charges. The density of the induced charges on the surface of the first conductive layer is $\sigma_0$, and the density of the induced charges on the surface of the second conductive layer is $\sigma_1$. $S_1$ is the distance between the first conductive layer and the second conductive layer, $\varepsilon_r$ is the relative dielectric constant of the electret membrane, and $\varepsilon_{r1}$ is the relative dielectric constant of the air gap between the first conductive layer and the second conductive layer. E is the intensity of the electrostatic field between the first conductive layer and the second conductive layer.

According to the Gauss Theorem and Kirchhoff's Second Law, the following equation is obtained:

$$E = \frac{s\sigma}{\varepsilon_r \varepsilon_{r1} s + \varepsilon_r \varepsilon_{r1} s_1}$$

It can be seen that the intensity of the electrostatic field generated by the electret membrane is inversely related to the distance between the first conductive layer and the second conductive layer.

The sterilization mode has higher requirements on the intensity of the electrostatic field, and an electrostatic field with higher intensity can better inactivate bacteria and improve the sterilization efficiency. Therefore, in the sterilization mode, the air gap distance between the first conductive layer and the second conductive layer is reduced, and the sterilization effect can be effectively improved.

However, an electrostatic field with lower intensity is enough for the fresh-keeping mode, and a larger air gap distance is conducive to storing more food materials. Therefore, in the fresh-keeping mode, the air gap distance between the first conductive layer and the second conductive layer can be appropriately increased.

In the embodiment herein, the distance between the first conductive layer and the second conductive layer is adjusted in different working modes to facilitate the switch between the sterilization and fresh-keeping modes, which is beneficial for improving the user experience.

In any of the above embodiments, the storage apparatus further includes a fan oriented towards the air gap between the first side wall and the second side wall, and the controller is further configured to control the fan to begin operating in response to the sterilizing instruction.

In this embodiment, the storage apparatus further includes the fan having an outlet directed towards the air gap between the first side wall and the second side wall. When the box assembly is operated in the sterilization mode, the air in the compartment of the refrigerator is guided through the air gap between the first conductive layer and the second conductive layer by the fan, i.e., through the electrostatic field, hence the bacteria suspended in the air are inactivated in the electrostatic field, and thus effective sterilization is achieved.

Herein, the operation of the fan can further be controlled according to the state (i.e., being opened or closed) of the door body of the compartment. When the door of a refrigerator is detected to be opened, since the compartment of the refrigerator is in communication with the external environment now, the exchange of the air in the compartment with the external air may be accelerated if the fan continues operating, resulting in the loss of the cold energy and the massive invasion of external bacteria into the compartment. Therefore, at this time, the fan can be controlled to stop.

When the door of the refrigerator is detected to be closed, the external bacteria may invade into the compartment at the moment that the door is opened, and at this time, the fan is controlled to automatically operate for a while at the maximum rate, which can effectively kill the invasive bacteria in the compartment and enable the function of sterilizing, fresh keeping, and deodorizing.

In any of the above embodiments, the storage apparatus further includes a display control device connected to the controller for receiving the sterilizing instruction and the fresh-keeping instruction and displaying the working state of the box assembly.

In the embodiment, the display control device may be a touch screen or a combination of a display screen and switch keys, and the embodiments of the present disclosure do not limit the specific type of the display control device.

The display control device can receive the sterilizing instruction or the fresh-keeping instruction from a user and show the working state of the box assembly. In an embodiment, when the box assembly operates in the sterilization mode, the display control device correspondingly displays a text message that reads "sterilization in progress" or an animation message; when the sterilization is finished, the words like "sterilization finished" and "fresh keeping in progress" can be displayed.

Similarly, in an embodiment, when the box assembly operates in the fresh-keeping mode, the display control device correspondingly displays a text message that reads "fresh keeping in progress", as well as the elapsed time after entering the fresh-keeping mode, such as "in fresh keeping for 48 hours". As such, the user is well informed of the operation state of the storage apparatus at any time and enjoys a good user experience.

In any of the above embodiments, the first conductive layer and the second conductive layer are metal conductive layers.

In this embodiment, the first conductive layer and the second conductive layer can be formed as "electrodes", and the material thereof can be selected as a metal material and made into a metal conductive layer. Herein, the metal conductive layer can be an aluminum, copper, iron, or silver conductive layer, and in some embodiments, the metal material can be replaced by non-metallic conductive materials such as elemental carbon and isostructural forms of carbon. The specific material of the metal conductive layer is not limited to the embodiments of the present disclosure.

In any of the above embodiments, the electret membrane includes the electret material matrix, and the metal electrode provided on one side of the electret material matrix and attached to the electret material matrix.

In this embodiment, the electret is a dielectric material capable of long-term storage of electric charges. Therefore, the metal electrode is provided on one side of the electret material matrix, and the metal electrode is electrically polarized under the influence of the charges of the electret, and an electrode is formed without an external power source.

In an embodiment, because of the electric polarization of the electret membrane, the electret membrane can form an electrostatic field in the storage unit; in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, in the electrostatic field, the cell membrane of bacteria may show perforation polarization, and then suffer irreversible damage, resulting in the inactivation of bacteria. The fan can guide a certain range of air continuously into the electrostatic field, for effectively inactivating bacteria in the air passing through the air gap.

Given the technical solution herein, the electret membrane can be electrically polarized without an external power source and form an electrostatic field that can simplify the electrostatic-field fresh-keeping and sterilizing structure and reduce the cost of generating the electrostatic field, which facilitates low-cost and highly reliable fresh-keeping and sterilizing effects through the electrostatic field.

In the above embodiment, the first electret membrane and the second electret membrane further include a hydrophobic layer provided on an outer surface of the electret material matrix and/or the metal electrode.

In this embodiment, when the electret membrane is applied in a refrigerator, condensed water is easily generated outside the electret membrane due to the cellular respiration of vegetables and fruits. Providing the hydrophobic layer on the outer surface of the electret membrane can effectively prevent the condensed water from invading into the interior of the electret membrane to cause charge loss or rust on the metal electrode, protect the electret membrane, and improve the service life of the electret membrane.

In any of the above embodiments, a material of the electret material matrix includes at least one of: poly tetra fluoroethylene, polypropylene, polyethylene, tetrafluorethylene-hexafluoropropylene, fluorinated ethylene propylene copolymer, silicon dioxide, aluminium oxide, magnesium dioxide, and silicon tetranitride.

In this embodiment, the electret material matrix includes electret materials, and in particular, the electret materials include poly tetra fluoroethylene (PTEF), polypropylene (PP), polyethylene (PE), tetrafluorethylene-hexafluoropropylene (F46), fluorinated ethylene-propylene copolymer (FEP), silicon dioxide, aluminium oxide, magnesium dioxide, and silicon tetranitride, and polyethylene includes large-size crystal-structure high-density polyethylene (HDPE), microcrystalline high-density polyethylene, medium-density polyethylene (HDPE) and low-density polyethylene (LDPE).

It should be understood that the electret materials include one or mixtures of the above materials, as well as other known electret materials; the embodiments of the present disclosure do not limit the types of the electret materials, and any material having electret properties is a possible embodiment of the present disclosure.

In any of the above embodiments, the metal electrode includes aluminum electrodes, copper electrodes, iron electrodes, or silver electrodes.

In this embodiment, the metal electrode includes aluminum electrodes, copper electrodes, iron electrodes, or silver electrodes. The specific materials of the metal electrode are not limited to the embodiments of the present disclosure.

BRIEF DESCRIPTION OF THE DRAWINGS

The foregoing and/or additional aspects and advantages of the present disclosure will become apparent and readily appreciated from the following description of the embodiments, taken in conjunction with the accompanying drawings of which.

A list of reference signs in FIGS. 1 to 16 is as follows:

100 electret membrane, 102 electret material matrix, 104 metal electrode, 106 hydrophobic layer;

200 box assembly, 202 upper cover plate, 206 second conductive layer, 2062 second ground line, 208 first electret membrane, 210 first side wall, 212 body, 214 first conductive layer, 2142 first ground line, 216 second side wall, 218 support plate;

300 refrigeration apparatus, 302 refrigeration compartment;

400 sterilization apparatus, 402 second electret membrane, 404 first conductive layer, 4042 first ground line, 406 first electret membrane, 408 second conductive layer, 4082 second ground line, 410 fan;

500 refrigerator, 502 refrigeration compartment, 506 door body, 508 door sensor;

600 refrigeration apparatus, 602 refrigeration compartment, 604 box assembly, 6041 first side wall, 6042 second conductive layer, 6043 first electret membrane, 6044 second electret membrane, 6045 first conductive layer, 6046 second side wall, 6047 first connecting portion, 6048 second connecting portion, 6049 adjusting component;

700 refrigerator drawer, 702 upper cover plate, 704 first electret membrane, 706 second conductive layer, 708 first side wall, 710 second side wall, 712 first conductive layer, 714 second ground line, 716 first ground line.

DETAILED DESCRIPTION OF THE DISCLOSURE

In order that the above-recited objects, features, and advantages of the present disclosure may be more clearly understood, a more particular description of the disclosure will be rendered by reference to specific embodiments thereof which are illustrated in the appended drawings. It should be noted that the embodiments and features of the embodiments of the present disclosure can be combined with each other without conflict.

In the following description, numerous specific details are set forth to provide a thorough understanding of the present disclosure. However, the present disclosure may be practiced otherwise than as described herein. Accordingly, the scope of the present disclosure is not limited by the specific embodiments disclosed below.

A storage apparatus according to some embodiments of the present disclosure is described below with reference to FIGS. 1 to 16.

Embodiment 1

Figure 1:
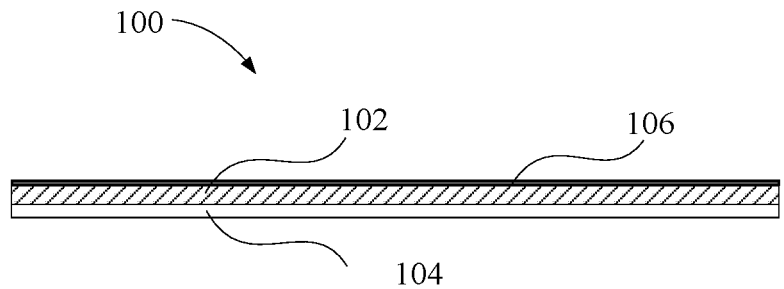
FIG. 1 shows a structure of an electret membrane according to an embodiment of the present disclosure.

FIG. 1 shows a structure of an electret membrane 100 according to an embodiment of the present disclosure. The electret membrane 100 includes: an electret material matrix 102, a metal electrode 104 provided on one side of the matrix and attached to the electret material matrix 102, and a hydrophobic layer 106 provided on an outer surface of the electret material matrix 102 and/or the metal electrode 104.

Herein, the materials of the electret material matrix 102 includes at least one of poly tetra fluoroethylene, polypropylene, and polyethylene.

The metal electrode 104 includes aluminum electrode and aluminum alloy electrode, copper electrode and copper alloy electrode, iron electrode and iron alloy electrode, or silver electrode and silver alloy electrode.

In the embodiment herein, the electret is a dielectric material capable of long-term storage of electric charges. Therefore, the metal electrode 104 is provided on one side of the electret material matrix 102, and the metal electrode 104 is electrically polarized under the influence of the charges of the electret, and an electrode is formed without an external power source.

In an embodiment, the electret membrane 100 of the embodiment herein is provided in a storage compartment of a refrigerator, and in particular, on one side of a storage unit such as a storage grid, a drawer, and a fresh-keeping box of the refrigerator; because of the electric polarization of the electret membrane 100, the electret membrane 100 can form an electrostatic field in the storage unit; in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, for fruits and vegetables, the activity of biological enzyme is further one of the main factors affecting the metabolism, and the structural changes of water molecules around enzyme protein will further cause changes in the physiological state of fruits and vegetables. The water molecules in the fruit and vegetable cells are polar molecules and exist in the form of a water molecule cluster formed by hydrogen bonding, and this water molecule cluster is a non-fixed dynamic structure. In the electrostatic field, the structure of the water molecule cluster will change, and then change how the water molecules are bonded to the enzyme protein, and the activity of the enzyme protein is reduced, which further inhibits the metabolism of fruits and vegetables for fresh keeping.

Furthermore, cellular respiration exists in the food such as fruits and vegetables, and it is mainly iron ions that serve as a transporter of electrons in the respiration. The electrostatic field affects the iron ions and then disturbs the metabolism associated with the iron ions, and the electron transfer in a respiration chain of the fruits or vegetables is blocked, and thus the respiration of the plant would be inhibited, for inhibiting the metabolism of the fruits or vegetables for fresh keeping.

When the electret membrane 100 is applied in a refrigerator, condensed water is easily generated outside the electret membrane 100 due to the cellular respiration of vegetables and fruits. Providing the hydrophobic layer 106 on the outer surface of the electret membrane 100 can effectively prevent the condensed water from invading into the interior of the electret membrane 100 to cause charge loss or rust on the metal electrode 104, protect the electret membrane 100, and improve the service life of the electret membrane 100.

Herein, the electret material matrix 102 includes an electret material, the electret material includes poly tetra fluoroethylene (PTEF), polypropylene (PP), and polyethylene (PE), and polyethylene includes large-size crystal-structure high-density polyethylene (HDPE), microcrystalline high-density polyethylene, medium-density polyethylene (HDPE) and low-density polyethylene (LDPE).

It should be understood that the electret materials include one or mixtures of the above materials, as well as other known electret materials; the embodiments of the present disclosure do not limit the types of the electret materials, and any material having electret properties is a possible embodiment of the present disclosure.

The metal electrode 104 includes aluminum electrode and aluminum alloy electrode, copper electrode and copper alloy electrode, iron electrode and iron alloy electrode, or silver electrode and silver alloy electrode. The specific materials of the metal electrode 104 are not limited to embodiments of the present disclosure.

Given the embodiment herein, an electret membrane 100 is prepared, the electret membrane 100 can be electrically polarized without an external power source and form an electrostatic field that can simplify the electrostatic-field fresh-keeping structure and reduce the cost of generating the electrostatic field when applied to the fresh-keeping function of equipment such as a refrigerator, which is conducive to providing the fresh-keeping equipment such as a refrigerator with a low-cost and highly reliable fresh-keeping electrostatic field.

Embodiment 2

Figure 2:
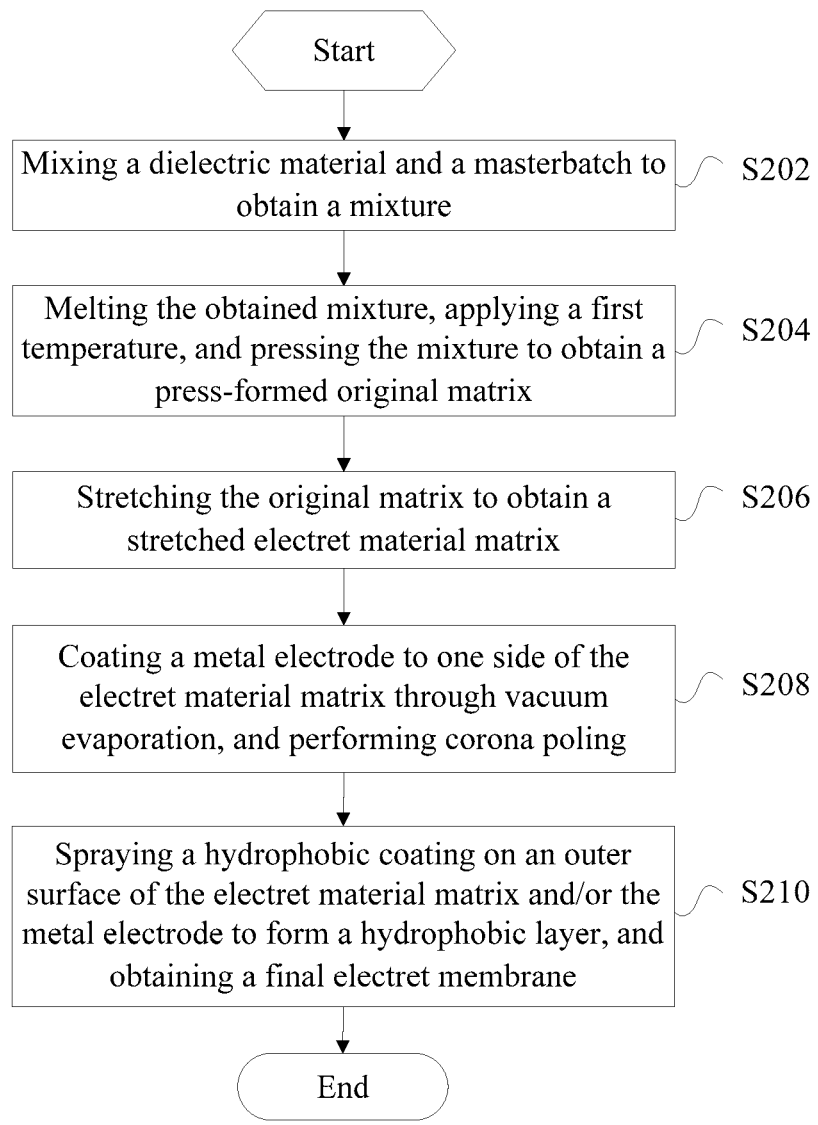
FIG. 2 is a first flowchart of a preparation method of an electret membrane according to an embodiment of the present disclosure.

FIG. 2 is a first flowchart of a preparation method of an electret membrane according to an embodiment of the present disclosure, wherein the preparation method is used for producing the electret membrane provided in "Embodiment 1".

In an embodiment, the preparation method includes steps of:

step S202, mixing a dielectric material and a masterbatch to obtain a mixture;

step S204, melting the obtained mixture, applying a first temperature, and pressing the mixture to obtain a press-formed original matrix;

step S206, stretching the original matrix to obtain a stretched electret material matrix;

step S208, coating a metal electrode to one side of the electret material matrix through vacuum evaporation, and performing corona poling; and step S210, spraying a hydrophobic coating on an outer surface of the electret material matrix and/or the metal electrode to form a hydrophobic layer, and obtaining a final electret membrane.

Herein, the hydrophobic coating includes at least one of ethylene tetrafluoroethylene copolymer, polyolefin, polycarbonate, and polyamide.

In the embodiment herein, the materials forming the electret material matrix in the electret membrane include primarily the dielectric material and the masterbatch, and the dielectric material and the masterbatch are mixed, a proportion of the dielectric material can range between 75% and 85%, and a proportion of the masterbatch correspondingly ranges between 25% and 15%.

After the dielectric material and the masterbatch are mixed, a melt blending process is performed, during which the mixture is pressed at the first temperature to obtain the original matrix in its original state.

After the original matrix is obtained, the original matrix is stretched and processed into a "membrane"-shaped electret material matrix with a proper thickness, the metal electrode is coated to one side of the matrix through vacuum evaporation and the metal electrode is subjected to corona poling to obtain the electret membrane.

When the electret membrane is applied in a refrigerator, condensed water is easily generated outside the electret membrane due to the cellular respiration of vegetables and fruits. Providing the hydrophobic layer on the outer surface of the electret membrane can effectively prevent the condensed water from invading into the interior of the electret membrane to cause charge loss or rust on the metal electrode, protect the electret membrane, and improve the service life of the electret membrane.

Herein, the hydrophobic coating includes ethylene-tetrafluoroethylene copolymer, polyolefin, polycarbonate, and polyamide.

It should be understood that the hydrophobic coating includes a solution or mixture of the above materials, as well as other known hydrophobic coatings. The embodiments of the present disclosure do not limit the type of hydrophobic coating, and any material having hydrophobic properties is a possible embodiment of the present disclosure.

The preparation of the electret membrane through the process provided in the embodiments of the present disclosure is simple and has a high yield, and efficient batch preparation of the electret membrane at a low cost is achieved. The resulting electret membrane can be electrically polarized without an external power source and form an electrostatic field that can simplify the electrostatic-field fresh-keeping structure when applied to the fresh-keeping function of equipment such as a refrigerator and reduce the cost of generating the electrostatic field, which is conducive to providing the fresh-keeping equipment such as a refrigerator with a low-cost and highly reliable fresh-keeping electrostatic field.

Embodiment 3

In the preparation method of an electret membrane shown in FIG. 2, the dielectric material mentioned in step S202 includes poly tetra fluoroethylene, polypropylene, large-size crystal-structure high-density polyethylene, microcrystalline high-density polyethylene, medium-density polyethylene, and low-density polyethylene.

In the embodiment herein, the dielectric material includes poly tetra fluoroethylene (PTEF), polypropylene (PP), and polyethylene (PE), and polyethylene includes large-size crystal-structure high-density polyethylene (HDPE), microcrystalline high-density polyethylene, medium-density polyethylene (MDPE) and low-density polyethylene (LDPE).

It should be understood that the dielectric material includes one or mixtures of the above materials, as well as other known electret materials; the present embodiments do not limit the types of the electret materials, and any material having electret properties is a possible embodiment of the present disclosure.

Given the dielectric material of the embodiment herein, efficient batch preparation of the electret membrane at a low cost is achieved. The resulting electret membrane can be electrically polarized without an external power source and form an electrostatic field that can simplify the electrostatic-field fresh-keeping structure when applied to the fresh-keeping function of equipment such as a refrigerator and reduce the cost of generating the electrostatic field, which is conducive to providing the fresh-keeping equipment such as a refrigerator with a low-cost and highly reliable fresh-keeping electrostatic field.

Embodiment 4

In the preparation method of an electret membrane shown in FIG. 2, the masterbatch mentioned in step S202 includes polypropylene, calcium carbonate, titanium oxide, and a coupling agent.

Herein, a proportion of the polypropylene is 37.5% to 47.5%, a proportion of the calcium carbonate is 42.5% to 52.5%, a proportion of the titanium oxide is 2.5% to 7.5%, and a proportion of the coupling agent is 2.5% to 7.5%.

In the embodiment herein, the masterbatch includes polypropylene (PP), calcium carbonate ($CaCO_3$), titanium oxide ($TiO_2$) and a coupling agent, and the coupling agent can be a chromium complex coupling agent, a silane coupling agent, a titanate coupling agent, and the like. The specific type of the coupling agent is not limited to the embodiments of the present disclosure.

Herein, the proportion of the polypropylene (PP) in the total masterbatch is between 37.5% and 47.5%, the proportion of the calcium carbonate ($CaCO_3$) in the total masterbatch is between 42.5% and 52.5%, the proportion of the titanium oxide ($TiO_2$) in the total masterbatch is between 2.5% and 7.5%, and the proportion of the coupling agent in the total masterbatch is between 2.5% and 7.5%.

It should be understood that the above proportions may be adjusted depending on the actual production, and a sum of the proportions of the components in the masterbatch shall be 1, however, the sum may be less than 1 taking into account possible impurities.

Given the components and proportions thereof in the masterbatch according to the embodiment herein, efficient batch preparation of the electret membrane at a low cost is achieved. The resulting electret membrane can be electrically polarized without an external power source and form an electrostatic field that can simplify the electrostatic-field fresh-keeping structure when applied to the fresh-keeping function of equipment such as a refrigerator and reduce the cost of generating the electrostatic field, which is conducive to providing the fresh-keeping equipment such as a refrigerator with a low-cost and highly reliable fresh-keeping electrostatic field.

Embodiment 5

In the preparation method of an electret membrane shown in FIG. 2, the first temperature mentioned in step S204 ranges from 230° C. to 250° C.

In the embodiment herein, in the step of melt-blending the dielectric material and the masterbatch, the melt-blending is performed at a temperature ranging between 230° C. and 250° C., which is advantageous for improving the mixing efficiency and the quality of the prepared electret material matrix.

It can be understood that the melting temperature can be adjusted accordingly depending on the type of the dielectric material and the type of the masterbatch to ensure the preparation effect.

Given the melting temperature provided in the embodiment of the present disclosure, the preparation of the electret membrane is simple in the process and has a high yield. Efficient batch preparation of the electret membrane at a low cost is achieved. The resulting electret membrane can be electrically polarized without an external power source and form an electrostatic field that can simplify the electrostatic-field fresh-keeping structure when applied to the fresh-keeping function of equipment such as a refrigerator and reduce the cost of generating the electrostatic field, which is conducive to providing the fresh-keeping equipment such as a refrigerator with a low-cost and highly reliable fresh-keeping electrostatic field.

Embodiment 6

Figure 3:
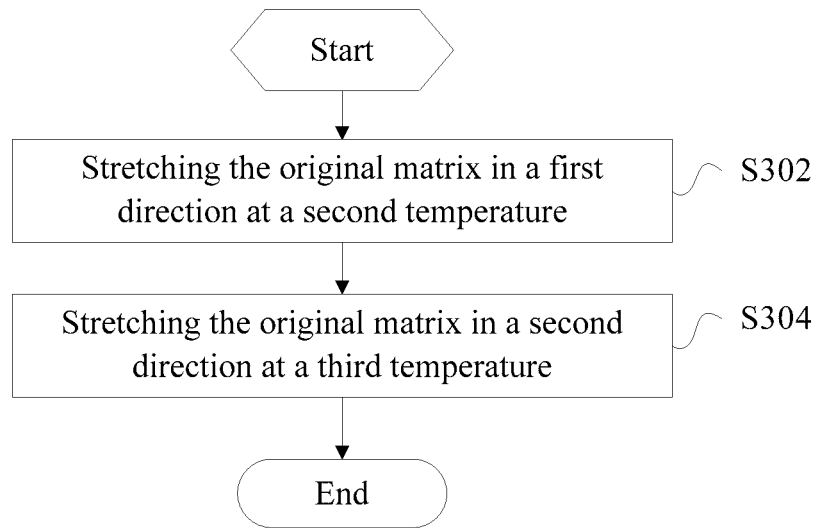
FIG. 3 is a second flowchart of the preparation method of an electret membrane according to an embodiment of the present disclosure.

FIG. 3 is a second flowchart of the preparation method of an electret membrane according to an embodiment of the present disclosure, and the process of stretching the original matrix can include:

step S302, stretching the original matrix in a first direction at a second temperature; and step S304, stretching the original matrix in a second direction at a third temperature.

Herein, the first direction is perpendicular to the second direction, the second temperature ranges from 100° C. to 125° C., and the third temperature ranges from 158° C. to 175° C.

In the embodiment herein, after the original matrix is obtained by pressing, the original matrix is stretched in a length direction and a width direction of the original matrix, respectively, to stretch the original matrix to a suitable thickness.

In an embodiment, the original matrix is stretched lengthwise at the second temperature and then widthwise at the third temperature. It can be understood that the original matrix formed after pressing is a "plate" shape; to improve the production efficiency, the press-formed original matrix is stretched in both directions for secondary shaping, and finally a thinner electret material matrix with a more uniform thickness is obtained, which is conducive to improving the preparation efficiency and yield of the electret membrane.

Herein, the original matrix is stretched lengthwise at a temperature ranging from 100° C. to 125° C., and then stretched widthwise at a temperature ranging from 158° C. to 175° C. It can be understood that the temperature at which the matrix is stretched is related to the types of the masterbatch and dielectric material, and the melting temperature can be adjusted correspondingly according to the types of the dielectric material and masterbatch to ensure the stretching effect.

Given the preparation process provided in the embodiment of the present disclosure, the preparation of the electret membrane features a simple process and a high yield. Efficient batch preparation of the electret membrane at a low cost is achieved. The resulting electret membrane can be electrically polarized without an external power source and form an electrostatic field that can simplify the electrostatic-field fresh-keeping structure when applied to the fresh-keeping function of equipment such as a refrigerator and reduce the cost of generating the electrostatic field, which is conducive to providing the fresh-keeping equipment such as a refrigerator with a low-cost and highly reliable fresh-keeping electrostatic field.

Embodiment 7

In some embodiments of the present disclosure, the metal electrode includes aluminum electrode and aluminum alloy electrode, copper electrode and copper alloy electrode, iron electrode and iron alloy electrode, or silver electrode and silver alloy electrode, and a thickness of the metal electrode ranges from 80 nm to 120 nm.

In the embodiment herein, the metal electrode includes aluminum electrode and aluminum alloy electrode, copper electrode and copper alloy electrode, iron electrode and iron alloy electrode, or silver electrode and silver alloy electrode. The specific materials of the metal electrode are not limited to embodiments of the present disclosure.

Moreover, the thickness of the metal electrode is 80 nm to 120 nm. According to different application scenarios and different thickness requirements of the electret membrane, the thickness of the metal electrode can be adjusted correspondingly, and the specific thickness of the metal electrode is not defined in the embodiments of the present disclosure.

Embodiment 8

Figure 4:
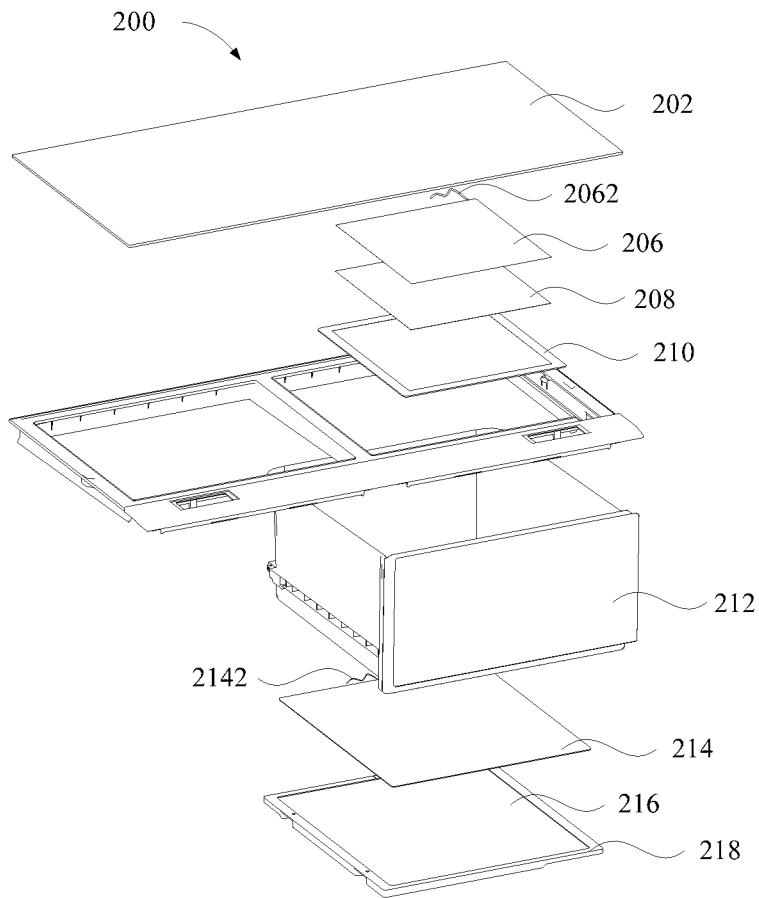
FIG. 4 shows a structure of a box assembly according to an embodiment of the present disclosure.

FIG. 4 shows a structure of a box assembly 200 according to an embodiment of the present disclosure, and the box assembly 200 includes a body 212, a storage chamber, a first electret membrane 208, and a first conductive layer 214, the storage chamber including a first side wall 210 provided with the first electret membrane 208 and a second side wall 216 provided with the second conductive layer 206.

Herein, the first side wall 210 and the second side wall 216 are arranged opposite to each other, and the first conductive layer 214 is in parallel with the first electret membrane 208.

In the embodiment herein, the box assembly 200 can be used to store food such as vegetables and fruits, and the box assembly 200 has the storage chamber formed therein, and the stored food is placed in the storage chamber. The storage chamber includes the first side wall 210 and the second side wall 216 which are arranged opposite to each other, for example, the first side wall 210 is a "top wall", and the second side wall 216 is a "bottom wall".

The first electret membrane 208 is disposed on the first side wall 210, the first conductive layer 214 is disposed on the second side wall 216, and the first electret membrane 208 and the first conductive layer 214 are arranged in parallel, and an electrostatic field can be formed between the first electret membrane 208 and the first conductive layer 214, and the electrostatic field can effectively prolong the shelf life of the food.

In an embodiment, the electret membrane itself can store electric charges for a long time, and therefore under the influence of the electric charges, the electret membrane has a certain polarity. Affected by the electret membrane, the first conductive layer 214 further polarizes, and therefore an electrostatic field with a fixed direction can be formed between the first electret membrane 208 and the first conductive layer 214, that is, a stable electrostatic field is formed in the storage chamber and can be maintained without a power supply circuit, additional power supply line, or a power supply source.

In the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, for fruits and vegetables, the activity of biological enzyme is further one of the main factors affecting the metabolism, and the structural changes of water molecules around enzyme protein will further cause changes in the physiological state of fruits and vegetables. The water molecules in the fruit and vegetable cells are polar molecules and exist in the form of a water molecule cluster formed by hydrogen bonding, and this water molecule cluster is a non-fixed dynamic structure. In the electrostatic field, the structure of the water molecule cluster will change, and then change how the water molecules are bonded to the enzyme protein, and the activity of the enzyme protein is reduced, which further inhibits the metabolism of fruits and vegetables for fresh keeping.

Furthermore, cellular respiration exists in the food such as fruits and vegetables, and it is mainly iron ions that serve as a transporter of electrons in the respiration. The electrostatic field affects the iron ions and then disturbs the metabolism associated with the iron ions, and the electron transfer in a respiration chain of the fruits or vegetables is blocked, and thus the respiration of the plant would be inhibited, for inhibiting the metabolism of the fruits or vegetables for fresh keeping.

Given the embodiment herein, a stable electrostatic field is formed in the storage chamber of the box assembly 200 without a power source and power supply line. On the one hand, the structure thereof is simple and the cost is low, which is beneficial to production and promotion; on the other hand, long-term fresh-keeping storage of food can be achieved through the electrostatic field, and the applicability to food storage devices such as a refrigerator is enabled, for improving the product competitiveness of corresponding devices in the market.

Embodiment 9

In some embodiments herein, as shown in FIG. 4, the box assembly 200 further includes a second conductive layer 206 provided on the first side wall 210, and the first electret membrane 208 is between the second conductive layer 206 and the first side wall 210, and the second conductive layer 206 is in parallel with the first conductive layer 214.

In the embodiment herein, the box assembly 200 further includes the second conductive layer 206 provided on the first side wall 210, and the second conductive layer 206 is in parallel with the first conductive layer 214, that is, opposite electrical shielding layers are formed by the second conductive layer 206 in combination with the first conductive layer 214, and the electrostatic field generated by the electret membrane is limited in a direction from the first side wall 210 to the second side wall 216.

Taking the first side wall 210 as a top wall and the second side wall 216 as a bottom wall as an example, since the top wall and the bottom wall are respectively provided with the first conductive layer 214 and the second conductive layer 206 that are arranged opposite and parallel to each other, the electrostatic field can be limited in a vertical direction from the first side wall 210 to the second side wall 216, i.e., between the top wall and the bottom wall. With the electrostatic field limited in one direction, a situation where electrostatic fields in multiple directions cancel each other is avoided, which is conducive to improving the intensity of the electrostatic field and rendering a better fresh-keeping effect of storing food.

Embodiment 10

In some embodiments herein, as shown in FIG. 4, the box assembly 200 further includes a first ground line 2142 through which the first conductive layer 214 is grounded, and a second ground line 2062 through which the second conductive layer 206 is grounded.

In the embodiment herein, the first ground line 2142 and the second ground line 2062 are provided in the box assembly 200. The first ground line 2142 is connected to the first conductive layer 214 and the first conductive layer 214 is grounded. Similarly, the second ground line 2062 is connected to the second conductive layer 206 and the second conductive layer 206 is grounded. With the first conductive layer 214 and the second conductive layer 206 grounded, the first conductive layer 214 and the second conductive layer 206 have equal potentials, which can ensure that the electrostatic field generated by the electret membrane is limited in a fixed direction, advantageous for improving the intensity of the electrostatic field and rendering a better fresh-keeping effect of storing food.

In some embodiments, the first ground line 2142 is in communication with the second ground line 2062, that is, the first conductive layer 214 and the second conductive layer 206 are commonly grounded, which can further increase the intensity of the electrostatic field.

In other embodiments, the first ground line 2142 and the second ground line 2062 are connected to a shell of the box assembly 200.

In still other embodiments, the box assembly 200 is placed in an electric home appliance such as a refrigerator, and the first ground line 2142 and the second ground line 2062 are connected to a ground line of the refrigerator or a shell of the refrigerator.

Embodiment 11

In some embodiments of the present disclosure, as shown in FIG. 4, the box assembly 200 further includes a support plate 218 provided on the body 212, and the first conductive layer 214 is between the second side wall 216 and the support plate 218.

In the embodiment herein, the box assembly 200 further includes a support plate 218, and the first conductive layer 214 is disposed between the second side wall 216 and the support plate 218, that is, the first conductive layer 214 is "clamped" to the second side wall 216 by the support plate 218. Here, the detachable connection between the support plate 218 and the body 212 makes it possible to "add" the first conductive layer 214 to the original box assembly 200 or render the first conductive layer 214 replaceable. On the one hand, the structure of the box assembly 200 can be simplified, and on the other hand, the expandability and maintainability of the refrigerator body assembly 200 can be better, and the design of the box assembly 200 is more facilitating and conducive to improving the product competitiveness.

Embodiment 12

In some embodiments of the present disclosure, as shown in FIG. 4, the box assembly 200 further includes an upper cover plate 202 provided on the body 212, and the first electret membrane 208 and the second conductive layer 206 are both between the upper cover plate 202 and the first side wall 210.

In the embodiment herein, the box assembly 200 further includes the upper cover plate 202, and the first electret membrane 208 and the second conductive layer 206 are between the first side wall 210 and the upper cover plate 202, that is, the first electret membrane 208 and the second conductive layer 206 are "clamped" to the first side wall 210 by the upper cover plate 202. Here, the upper cover plate 202 is detachably connected to the body 212, and the first electret membrane 208 and the second conductive layer 206 can be "added" to the original box assembly 200, or the first electret membrane 208 and the second conductive layer 206 are rendered replaceable. On the one hand, the structure of the refrigerator body assembly 200 can be simplified, and on the other hand, the expandability and maintainability of the box assembly 200 can be better, and the design of the box assembly 200 is more facilitating and conducive to improving the product competitiveness.

Embodiment 13

In some embodiments of the present disclosure, the first conductive layer 214 and the second conductive layer 206 are metal conductive layers.

In the embodiment herein, the first conductive layer 214 and the second conductive layer 206 can be formed as "electrodes", and the material thereof can be selected as a metal material and made into a metal conductive layer. Herein, the metal conductive layer can be an aluminum, copper, iron, or silver conductive layer, and in some embodiments, the metal material can be replaced by non-metallic conductive materials such as elemental carbon and isostructural forms of carbon. The specific material of the metal conductive layer is not limited to the embodiments of the present disclosure.

Embodiment 14

In some embodiments of the present disclosure, as shown in FIG. 4, the box assembly 200 further includes a second electret membrane provided on the second side wall 216, the second electret membrane is in parallel with the first electret membrane 208, and the charge polarity of the second electret membrane is opposite to the charge polarity of the first electret membrane 208.

In the embodiment herein, the second electret membrane may further be provided in the box assembly 200, and the second electret membrane may be on the second side wall 216, opposite and in parallel with the first electret membrane 208. Herein, the charge polarity of the second electret membrane is opposite to the charge polarity of the first electret membrane 208, that is, when the second electret membrane is positively charged, the first electret membrane 208 is negatively charged; when the second electret membrane is negatively charged, the first electret membrane 208 is positively charged.

In the embodiment herein, the configuration that the second electret membrane is in parallel with and has a different charge polarity from the first electret membrane 208 can effectively improve the intensity of the electrostatic field, and the metabolism of cells of food such as fruits and vegetables in such an electrostatic field with greater intensity is further inhibited, for improving the food fresh-keeping effect of the box assembly 200.

Embodiment 15

In some embodiments of the present disclosure, as shown in FIG. 4, the body 212 further includes a third side wall and a fourth side wall, the third side wall and the fourth side wall are arranged opposite to each other, and the box assembly 200 further includes a third electret membrane provided on the third side wall and/or a fourth electret membrane provided on the fourth side wall, the fourth electret membrane being in parallel with the third electret membrane, and the charge polarity of the fourth electret membrane is opposite to the charge polarity of the third electret membrane.

In the embodiment herein, more electret membranes can further be provided on the body 212, for further increasing the intensity of the electrostatic field to obtain a better fresh-keeping effect. The body 212 is provided with the third side wall and the fourth side wall, the third side wall and the fourth side wall can be any pair of opposing side walls, and the front wall and the rear wall, the left wall and the right wall, and further the top wall and the bottom wall.

In addition to the first electret membrane 208 and the second electret membrane, more electret membranes are provided, and only one more electret membrane may be provided, a pair of additional electret membranes that are arranged opposite to each other and have different charge polarities may be provided, or more electret membranes may be provided, to increase the intensity of the electrostatic field and obtain a better fresh-keeping effect of the box assembly 200.

Embodiment 16

FIG. 1 shows a structure of an electret membrane 100 according to an embodiment of the present disclosure. In the embodiment herein, as shown in FIG. 1, each of the first electret membrane, the second electret membrane, the third electret membrane, and the fourth electret membrane includes the electret material matrix 102, and the metal electrode 104 provided on one side of the electret material matrix 102 and attached to the electret material matrix 102.

In an embodiment herein, the electret is a dielectric material capable of long-term storage of electric charges. Therefore, the metal electrode 104 is provided on one side of the electret material matrix 102, and the metal electrode 104 is electrically polarized under the influence of the charges of the electret, and an electrode is formed without an external power source.

In an embodiment, because of the electric polarization of the electret membrane 100, the electret membrane 100 can form an electrostatic field in the storage unit; in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Given the embodiment herein, the electret membrane 100 can be electrically polarized without an external power source and form an electrostatic field that can simplify the electrostatic-field fresh-keeping structure and reduce the cost of generating the electrostatic field, which is conducive to producing a box assembly with a low-cost and highly reliable fresh-keeping electrostatic field.

Embodiment 17

Figure 5:
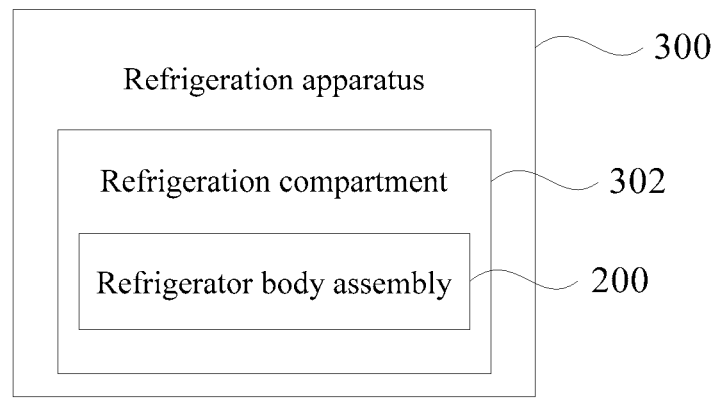
FIG. 5 is a block diagram showing a structure of a refrigeration apparatus according to an embodiment of the present disclosure.

In some embodiments of the present disclosure, a refrigeration apparatus 300 is provided. FIG. 5 is a block diagram showing a structure of a refrigeration apparatus according to an embodiment of the present disclosure, the refrigeration apparatus 300 includes a refrigeration compartment 302 and the box assembly 200 as provided in any of the above embodiments, the box assembly 200 being disposed within the refrigeration compartment 302.

In the embodiment herein, the refrigeration apparatus can be a refrigerator, a freezer, a cold storage, etc. Since the refrigeration compartment of the refrigeration apparatus is provided with the box assembly as provided in any one of the above embodiments, the refrigeration apparatus further includes all the advantages of the box assembly as provided in any one of the above embodiments, which will not be described in detail herein.

Embodiment 18

Figure 6:
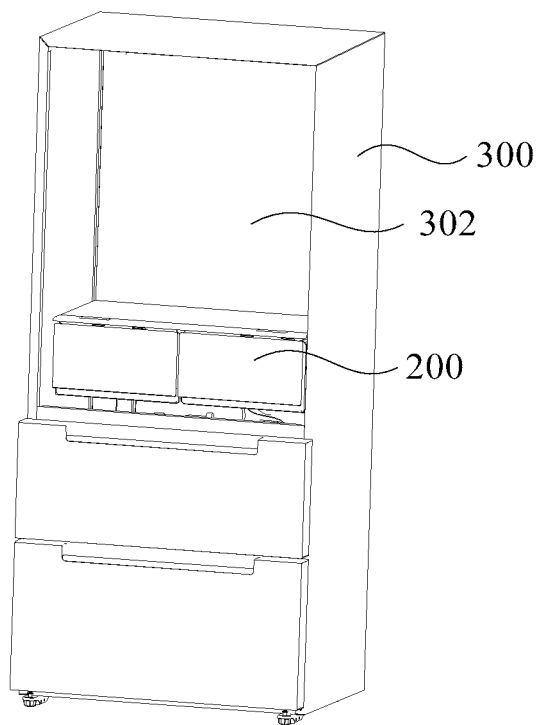
FIG. 6 shows a structure of a refrigeration apparatus according to an embodiment of the present disclosure.

FIG. 4 shows a structure of a box assembly 200 according to an embodiment of the present disclosure, and FIG. 6 shows a structure of the refrigeration apparatus 300 according to an embodiment of the present disclosure. As shown in FIGS. 4 and 6, the refrigeration apparatus 300 includes:

the refrigeration compartment 302, and the box assembly 200 provided in the refrigeration compartment 302, wherein the box assembly 200 includes: the body 212 including the storage chamber; the first electret membrane 208 detachably provided on the first side wall 210 of the storage chamber; the first conductive layer 214 on the second side wall 216 of the storage chamber, the second side wall 216 and the first side wall 210 are arranged opposite to each other, and the first conductive layer 214 is in parallel with the first electret membrane 208; a charge detection member connected to the electret membrane, and the charge detection member serves to detect a quantity of charges of the electret membrane; and a controller connected to the charge detection member, and the controller serves to generate a corresponding prompt message according to the quantity of charges.

In the embodiment herein, the refrigeration apparatus 300 can be a refrigerator, a freezer, a cold storage, or the like. The refrigeration apparatus 300 includes therein the refrigeration compartment 302, and the refrigeration compartment 302 is kept at a constant and low temperature as set by a user to preserve the quality and freshness of materials.

The refrigeration compartment 302 is provided with the box assembly 200, and the box assembly 200 can be used to store food such as vegetables and fruits, the box assembly 200 has the storage chamber formed therein, and the stored food is placed in the storage chamber. The storage chamber includes the first side wall 210 and the second side wall 216 which are arranged opposite to each other, for example, the first side wall 210 is a "top wall", and the second side wall 216 is a "bottom wall".

The first electret membrane 208 is disposed on the first side wall 210, the first conductive layer 214 is disposed on the second side wall 216, and the first electret membrane 208 and the first conductive layer 214 are arranged in parallel, and an electrostatic field can be formed between the first electret membrane 208 and the first conductive layer 214, and the electrostatic field can effectively prolong the shelf life of the food.

In an embodiment, the electret membrane itself can store electric charges for a long time, and therefore under the influence of the electric charges, the electret membrane has a certain polarity. Affected by the electret membrane, the first conductive layer 214 further polarizes, and therefore an electrostatic field with a fixed direction can be formed between the first electret membrane 208 and the first conductive layer 214, that is, a stable electrostatic field is formed in the storage chamber and can be maintained without a power supply circuit, additional power supply line, or a power supply source.

In the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, for fruits and vegetables, the activity of biological enzyme is further one of the main factors affecting the metabolism, and the structural changes of water molecules around enzyme protein will further cause changes in the physiological state of fruits and vegetables. The water molecules in the fruit and vegetable cells are polar molecules and exist in the form of a water molecule cluster formed by hydrogen bonding, and this water molecule cluster is a non-fixed dynamic structure. In the electrostatic field, the structure of the water molecule cluster will change, and then change how the water molecules are bonded to the enzyme protein, and the activity of the enzyme protein is reduced, which further inhibits the metabolism of fruits and vegetables for fresh keeping.

Furthermore, cellular respiration exists in the food such as fruits and vegetables, and it is mainly iron ions that serve as a transporter of electrons in the respiration. The electrostatic field affects the iron ions and then disturbs the metabolism associated with the iron ions, and the electron transfer in a respiration chain of the fruits or vegetables is blocked, and thus the respiration of the plant would be inhibited, for inhibiting the metabolism of the fruits or vegetables for fresh keeping.

Herein, the charges stored in the electret membrane may be lost due to external factors. With the loss of the charges, the electric field generated by the electret membrane will gradually weaken, which leads to the simultaneous decrease of the fresh-keeping effect. In the embodiment herein, a charge detection member is provided to simultaneously detect the quantity of charges in the first electret membrane 208 during the use of the refrigeration apparatus 300 and generate the corresponding prompt message according to the quantity of charges.

Moreover, since the first electret membrane 208 is of a detachable design, when the user receives the prompt message indicating that the quantity of charges of the first electret membrane 208 is low, he/she can replace the first electret membrane 208 manually to ensure the electric field intensity in the box assembly 200, which is conducive to maintaining the fresh-keeping effect of the refrigeration apparatus 300.

Given the embodiment herein, a stable electrostatic field is formed in the storage chamber of the box assembly 200 without a power source and power supply line. On the one hand, the structure thereof is simple and the cost is low, which is beneficial to production and promotion; on the other hand, long-term fresh-keeping storage of food can be achieved through the electrostatic field, for improving the fresh-keeping effect of the refrigeration apparatus 300.

Moreover, the electret membrane is designed as a detachable consumable piece, and the charge detection member is further provided, the refrigeration apparatus 300 such as a refrigerator can actively prompt the user to replace the electret membrane, and thus the electrostatic field intensity is kept constant, which avoids the decline of the fresh-keeping effect caused by the attenuation of the electrostatic field intensity and is conducive to improving the user experience of the product.

Embodiment 19

FIG. 4 shows a structure of a box assembly 200 according to an embodiment of the present disclosure. In some embodiment, the box assembly 200 further includes the second conductive layer 206 provided on the first side wall 210, wherein the first electret membrane 208 is between the second conductive layer 206 and the first side wall 210, and the second conductive layer 206 is in parallel with the first conductive layer 214.

In the embodiment herein, the box assembly 200 further includes the second conductive layer 206 provided on the first side wall 210, and the second conductive layer 206 is in parallel with the first conductive layer 214, that is, opposite electrical shielding layers are formed by the second conductive layer 206 in combination with the first conductive layer 214, and the electrostatic field generated by the electret membrane is limited in a direction from the first side wall 210 to the second side wall 216.

Taking the first side wall 210 as a top wall and the second side wall 216 as a bottom wall as an example, since the top wall and the bottom wall are respectively provided with the first conductive layer 214 and the second conductive layer 206 that are arranged opposite and parallel to each other, the electrostatic field can be limited in a vertical direction from the first side wall 210 to the second side wall 216, i.e., between the top wall and the bottom wall. With the electrostatic field limited in one direction, a situation where electrostatic fields in multiple directions cancel each other is avoided, which is conducive to improving the intensity of the electrostatic field and rendering a better fresh-keeping effect of storing food.

Embodiment 20

In some embodiments of the present disclosure, as shown in FIGS. 4 and 6, the refrigeration apparatus 300 further includes: the first ground line 2142 through which the first conductive layer 214 is grounded, and the second ground line 2062 through which the second conductive layer 206 is grounded.

In the embodiment herein, the refrigeration apparatus 300 includes the first ground line 2142 and the second ground line 2062. The first ground line 2142 is connected to the first conductive layer 214 and the first conductive layer 214 is grounded. Similarly, the second ground line 2062 is connected to the second conductive layer 206 and the second conductive layer 206 is grounded. With the first conductive layer 214 and the second conductive layer 206 grounded, the first conductive layer 214 and the second conductive layer 206 have equal potentials, which can ensure that the electrostatic field generated by the electret membrane is limited in a fixed direction, advantageous for improving the intensity of the electrostatic field and rendering a better fresh-keeping effect of storing food.

In some embodiments, the first ground line 2142 is in communication with the second ground line 2062, that is, the first conductive layer 214 and the second conductive layer 206 are commonly grounded, which can further increase the intensity of the electrostatic field.

In other embodiments, the first ground line 2142 and the second ground line 2062 are connected to the ground line of the refrigerator or the shell of the refrigerator.

Embodiment 21

In some embodiments of the present disclosure, as shown in FIG. 6, the refrigeration apparatus 300 further includes: a charger connected to the electret membrane and the controller, and the charger is adapted to charge the electret membrane, and the controller is further configured to control the operation of the charger on the basis of the quantity of charges.

In the embodiment herein, the charger is provided in the refrigeration apparatus 300 and is connected to the electret membrane; when detecting that the quantity of charges in the electret membrane is low, the controller can control the charger to charge the electret membrane according to a certain voltage or current to increase the electric charges stored in the electret membrane and ensure the intensity of the electrostatic field generated by the electret membrane, for ensuring the freshness-keeping effect of the refrigeration apparatus 300.

In an embodiment, the charger can be a charging circuit or a charging chip, and since neither a high voltage (or power) nor a fast charging rate is necessary for charging the electret membrane, a simple charging structure would be enough to charge the electret membrane after the charges in the electret membrane are lost, which is conducive to ensuring the intensity of the electrostatic field generated by the electret membrane, for guaranteeing the fresh-keeping effect. Moreover, a complex and expensive transformer or power supply structure is not necessary, which is beneficial for cost saving.

Embodiment 22

FIG. 1 shows a structure of an electret membrane 100 according to an embodiment of the present disclosure. In some embodiments of the present disclosure, as shown in FIG. 1, the electret membrane 100 includes the electret material matrix 102, and the metal electrode 104 provided on one side of the electret material matrix 102 and attached to the electret material matrix 102.

In an embodiment herein, the electret is a dielectric material capable of long-term storage of electric charges. Therefore, the metal electrode 104 is provided on one side of the electret material matrix 102, and the metal electrode 104 is electrically polarized under the influence of the charges of the electret, and an electrode is formed without an external power source.

In an embodiment, because of the electric polarization of the electret membrane 100, the electret membrane 100 can form an electrostatic field in the storage unit; in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, for fruits and vegetables, the activity of biological enzyme is further one of the main factors affecting the metabolism, and the structural changes of water molecules around enzyme protein will further cause changes in the physiological state of fruits and vegetables. The water molecules in the fruit and vegetable cells are polar molecules and exist in the form of a water molecule cluster formed by hydrogen bonding, and this water molecule cluster is a non-fixed dynamic structure. In the electrostatic field, the structure of the water molecule cluster will change, and then change how the water molecules are bonded to the enzyme protein, and the activity of the enzyme protein is reduced, which further inhibits the metabolism of fruits and vegetables for fresh keeping.

Furthermore, cellular respiration exists in the food such as fruits and vegetables, and it is mainly iron ions that serve as a transporter of electrons in the respiration. The electrostatic field affects the iron ions and then disturbs the metabolism associated with the iron ions, and the electron transfer in a respiration chain of the fruits or vegetables is blocked, and thus the respiration of the plant would be inhibited, for inhibiting the metabolism of the fruits or vegetables for fresh keeping.

Given the embodiment herein, the electret membrane 100 can be electrically polarized without an external power source and form an electrostatic field that can simplify the electrostatic-field fresh-keeping structure and reduce the cost of generating the electrostatic field, which is conducive to producing a refrigeration apparatus with a low-cost and highly reliable fresh-keeping electrostatic field.

Embodiment 23

Figure 7:
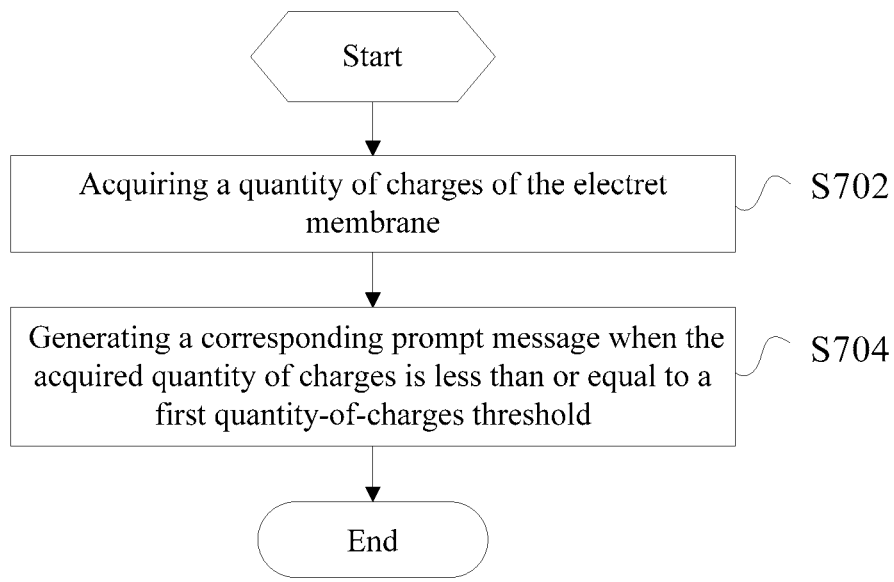
FIG. 7 is a first flowchart showing a method of controlling the refrigeration apparatus according to an embodiment of the present disclosure.

FIG. 7 is a first flowchart showing a method of controlling the refrigeration apparatus according to an embodiment of the present disclosure. In some embodiment, the method of controlling can include:

step S702, acquiring the quantity of charges of the electret membrane; and step S704, generating a corresponding prompt message when the acquired quantity of charges is less than or equal to a first quantity-of-charges threshold.

In the embodiment herein, the refrigeration apparatus can be a refrigerator, a freezer, a cold storage, or the like. The refrigeration apparatus includes therein the refrigeration compartment, and the refrigeration compartment is kept at a constant and low temperature as set by a user to preserve the quality and freshness of materials.

The box assembly is provided in the refrigeration compartment, and the box assembly can be used to store food such as vegetables and fruits, and the box assembly has the storage chamber formed therein, and the stored food is placed in the storage chamber. The storage chamber includes the first side wall and the second side wall which are arranged opposite to each other, for example, the first side wall is a "top wall", and the second side wall is a "bottom wall".

The first electret membrane is disposed on the first side wall, the first conductive layer is disposed on the second side wall, and the first electret membrane and the first conductive layer are arranged in parallel, and an electrostatic field can be formed between the first electret membrane and the first conductive layer, and the electrostatic field can effectively prolong the shelf life of the food.

In an embodiment, the electret membrane itself can store electric charges for a long time, and therefore under the influence of the electric charges, the electret membrane has a certain polarity. Affected by the electret membrane, the first conductive layer further polarizes, and therefore an electrostatic field with a fixed direction can be formed between the first electret membrane and the first conductive layer, that is, a stable electrostatic field is formed in the storage chamber and can be maintained without a power supply circuit, additional power supply line, or a power supply source.

In the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, for fruits and vegetables, the activity of biological enzyme is further one of the main factors affecting the metabolism, and the structural changes of water molecules around enzyme protein will further cause changes in the physiological state of fruits and vegetables. The water molecules in the fruit and vegetable cells are polar molecules and exist in the form of a water molecule cluster formed by hydrogen bonding, and this water molecule cluster is a non-fixed dynamic structure. In the electrostatic field, the structure of the water molecule cluster will change, and then change how the water molecules are bonded to the enzyme protein, and the activity of the enzyme protein is reduced, which further inhibits the metabolism of fruits and vegetables for fresh keeping.

Furthermore, cellular respiration exists in the food such as fruits and vegetables, and it is mainly iron ions that serve as a transporter of electrons in the respiration. The electrostatic field affects the iron ions and then disturbs the metabolism associated with the iron ions, and the electron transfer in a respiration chain of the fruits or vegetables is blocked, and thus the respiration of the plant would be inhibited, for inhibiting the metabolism of the fruits or vegetables for fresh keeping.

Herein, the charges stored in the electret membrane may be lost due to external factors. With the loss of the charges, the electric field generated by the electret membrane will gradually weaken, which leads to the simultaneous decrease of the fresh-keeping effect. In the embodiment herein, a charge detection member is provided to simultaneously detect the quantity of charges in the first electret membrane during the use of the refrigeration apparatus and generate the corresponding prompt message according to the quantity of charges.

Moreover, since the first electret membrane is of a detachable design, when the user receives the prompt message indicating that the quantity of charges of the first electret membrane is low, he/she can replace the first electret membrane manually to ensure the electric field intensity in the box assembly, which is conducive to maintaining the fresh-keeping effect of the refrigeration apparatus.

Moreover, in the embodiment herein, the charge detection member is further provided, the refrigeration apparatus such as a refrigerator can actively prompt the user to replace the electret membrane, and thus the electrostatic field intensity is kept constant, which avoids the decline of the fresh-keeping effect caused by the attenuation of the electrostatic field intensity and is conducive to improving the user experience of the product.

Embodiment 24

Figure 8:
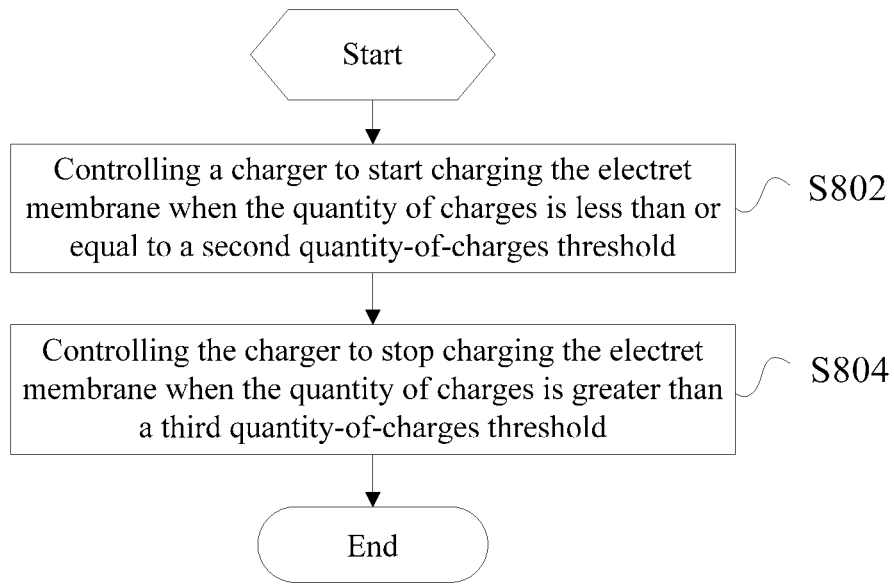
FIG. 8 is a second flowchart showing a method of controlling the refrigeration apparatus according to an embodiment of the present disclosure.

FIG. 8 is a second flowchart showing a method of controlling the refrigeration apparatus according to an embodiment of the present disclosure. In some embodiment, the method of controlling can include:

step S802, controlling a charger to start charging the electret membrane when the quantity of charges is less than or equal to a second quantity-of-charges threshold; and step S804, controlling the charger to stop charging the electret membrane when the quantity of charges is greater than a third quantity-of-charges threshold.

Herein, the third quantity-of-charges threshold is greater than the second quantity-of-charges threshold, and the second quantity-of-charges threshold is greater than the first quantity-of-charges threshold.

In the embodiment herein, the charger is provided in the refrigeration apparatus, and the charger is connected to the electret membrane; when a low quantity of charges in the electret membrane is detected, the charger can be controlled to charge the electret membrane according to a certain voltage or current to increase the electric charges stored in the electret membrane and ensure the intensity of the electrostatic field generated by the electret membrane, for ensuring the fresh-keeping effect of the refrigeration apparatus.

In an embodiment, if the quantity of charges of the electret membrane is less than or equal to the second quantity-of-charges threshold, the charger starts charging the electret membrane. During the charging process, the quantity of charges of the electret membrane is acquired in real time, and if the acquired quantity of charges is greater than the third quantity-of-charges threshold, the quantity of charges stored in the electret membrane is sufficient to maintain the electrostatic field intensity, and at this time, the charger is controlled to stop charging the electret.

In the embodiment herein, a simple charging structure is provided to charge the electret membrane after the charges in the electret membrane are attenuated, which is conducive to keeping the intensity constant of the electrostatic field generated by the electret membrane, for ensuring the fresh-keeping effect. Moreover, a complex and expensive transformer or power supply structure is not necessary, which is beneficial for cost saving.

Herein, the prompt message includes a text prompt message, audio prompt message, image prompt message, or optical prompt message.

When the quantity of charges of the electret membrane is detected to be less than the first quantity-of-charges threshold, a prompt message is sent to the user, and the prompt message can be a text prompt message displayed on a display device of the refrigerator to remind the user of replacing the electret membrane or charging in an intuitive text form.

The prompt message may also be an audio prompt message, and the audio prompt message may be a simple buzzer or human voice broadcast.

The prompt message may also be an image prompt message, and a simple icon serves to remind the user of a low quantity of charges of the electret membrane.

The prompt message may also be an optical prompt message, such as a flashing red light.

In the embodiment herein, a plurality of types of prompt message are provided and the user can be well informed of the quantity of the remaining charges of the electret membrane, while the specific types of prompt message are not limited to the embodiments of the present disclosure.

Embodiment 25

In some embodiments of the present disclosure, a computer-readable storage medium is provided, the computer-readable storage medium having stored thereon a computer program that is executable by a processor to implement the steps of the method of controlling a refrigeration apparatus as provided in any of the above embodiments, and therefore, the computer-readable storage medium includes all the advantages of the method for controlling a refrigeration apparatus as provided in any of the above embodiments, which will not be described in detail herein.

Embodiment 26

Figure 9A:
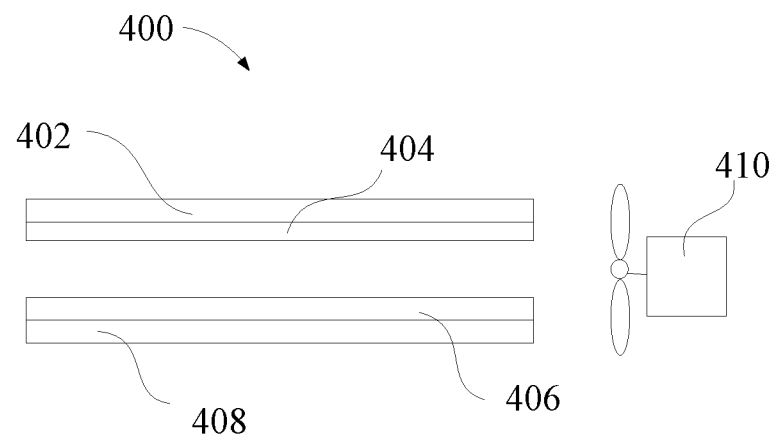
FIG. 9A is a first structural diagram of a sterilization apparatus according to an embodiment of the present disclosure.
Figure 9B:
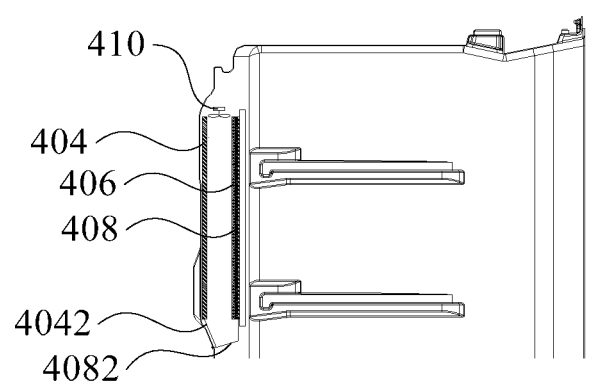
FIG. 9B is a second structural diagram of the sterilization apparatus according to an embodiment of the present disclosure.

FIG. 9A is a first structural diagram of a sterilization apparatus 400 according to an embodiment of the present disclosure, and FIG. 9B is a second structural diagram of the sterilization apparatus 400 according to an embodiment of the present disclosure. In some embodiment, the sterilization apparatus 400 includes: a first conductive layer 404; a second conductive layer 408, and the second conductive layer 408 and the first conductive layer 404 arranged opposite to each other, and an air gap exists between the first conductive layer 404 and the second conductive layer 408; a first electret membrane 406, and the first electret membrane 406 is provided on the second conductive layer 408, the first electret membrane 406 is between the first conductive layer 404 and the second conductive layer 408 and in parallel with the first conductive layer 404; a fan 410, and the fan 410 is oriented towards the air gap.

In the embodiment herein, the sterilization apparatus 400 includes the first conductive layer 404 and the second conductive layer 408 arranged opposite to each other, wherein the second conductive layer 408 is provided with the first electret membrane 406, an electrostatic field is generated in the air gap between the first conductive layer 404 and the second conductive layer 408 by the first electret membrane 406, and air is guided through the electrostatic field by the fan 410. Therefore, effective sterilization is rendered.

In an embodiment, the electret membrane itself can store electric charges for a long time, and therefore under the influence of the electric charges, the electret membrane has a certain polarity. Affected by the electret membrane, the first conductive layer 404 further polarizes, and therefore an electrostatic field with a fixed direction can be formed between the first conductive layer 404 and the second conductive layer 408 by the first electret membrane 406.

In the electrostatic field, the cell membrane of bacteria may show perforation polarization, and then suffer irreversible damage, resulting in the inactivation of bacteria. The fan 410 can guide a certain range of air continuously into the electrostatic field, for effectively inactivating bacteria in the air passing through the air gap.

Given the embodiment herein, an electrostatic field is generated between the first conductive layer 404 and the second conductive layer 408 by the electret membrane, without a power supply circuit to maintain it or an additional power supply line and a power source, simple in structure, low in cost, and easy to popularize, to facilitate the implementation of a cost-effective sterilization solution.

Embodiment 27

In some embodiments of the present disclosure, as shown in FIG. 9A, the sterilization apparatus 400 further includes a second electret membrane 402, wherein the second electret membrane 402 is provided on the first conductive layer 404, the second electret membrane 402 is in parallel with the first electret membrane 406, and the charge polarity of the second electret membrane 402 is opposite to the charge polarity of the first electret membrane 406.

In the embodiment herein, the sterilization apparatus 400 may further be provided with the second electret membrane 402 that is opposite and in parallel with the first electret membrane 406. Here, the charge polarity of the second electret membrane 402 is opposite to the charge polarity of the first electret membrane 406, that is, when the second electret membrane 402 is positively charged, the first electret membrane 406 is negatively charged; when the second electret membrane 402 is negatively charged, the first electret membrane 406 is positively charged.

In the embodiment herein, the second electret membrane 402 is in parallel with the first electret membrane 406, and the charge polarity of the second electret membrane 402 is opposite to the charge polarity of the first electret membrane 406, and thus the intensity of the electrostatic field is effectively increased, for improving the sterilization effect of the sterilization apparatus without external power supply.

Embodiment 28

In some embodiments of the present disclosure, as shown in FIG. 9A, the sterilization apparatus 400 further includes a first ground line 4042 through which the first conductive layer 404 is grounded and a second ground line 4082 through which the second conductive layer 408 is grounded.

In the embodiment herein, the first ground line 4042 and the second ground line 4082 are further provided in the sterilization apparatus 400. The first ground line 4042 is connected to the first conductive layer 404 and the first conductive layer 404 is grounded. Similarly, the second ground line 4082 is connected to the second conductive layer 408 and the second conductive layer 408 is grounded. With the first conductive layer 404 and the second conductive layer 408 grounded, the first conductive layer 404 and the second conductive layer 408 have equal potentials, which can ensure that the electrostatic field generated by the electret membrane is limited in a fixed direction, advantageous for improving the intensity of the electrostatic field and rendering a better fresh-keeping effect of storing food.

In some embodiments, the first ground line 4042 is in communication with the second ground line 4082, that is, the first conductive layer 404 and the second conductive layer 408 are commonly grounded, which can further increase the intensity of the electrostatic field.

In other embodiments, the first ground line 4042 and the second ground line 4082 are connected to a shell of the sterilization apparatus 400.

In still other embodiments, the sterilization apparatus 400 is placed in an electric home appliance such as a refrigerator, and the first ground line 4042 and the second ground line 4082 are connected to a ground line of the refrigerator or a shell of the refrigerator.

Herein, the first conductive layer 404 and the second conductive layer 408 are metal conductive layers.

The first conductive layer 404 and the second conductive layer 408 can be formed as "electrodes", and the material thereof can be selected as a metal material and made into a metal conductive layer. Herein, the metal conductive layer can be an aluminum, copper, iron, or silver conductive layer, and in some embodiments, the metal material can be replaced by non-metallic conductive materials such as elemental carbon and isostructural forms of carbon. The specific material of the metal conductive layer is not limited to the embodiments of the present disclosure.

Embodiment 29

FIG. 1 shows a structure of an electret membrane 100 according to an embodiment of the present disclosure. In some embodiment, as shown in FIG. 1, the electret membrane 100 includes the electret material matrix 102, and the metal electrode 104 provided on one side of the electret material matrix 102 and attached to the electret material matrix 102.

In an embodiment herein, the electret is a dielectric material capable of long-term storage of electric charges. Therefore, the metal electrode 104 is provided on one side of the electret material matrix 102, and the metal electrode 104 is electrically polarized under the influence of the charges of the electret, and an electrode is formed without an external power source.

In an embodiment, because of the electric polarization of the electret membrane 100, the electret membrane 100 can form an electrostatic field in the storage unit; in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Given the embodiment herein, the electret membrane 100 can be electrically polarized without an external power source and form an electrostatic field that can simplify the electrostatic-field fresh-keeping structure and reduce the cost of generating the electrostatic field, which is conducive to producing a box assembly with a low-cost and highly reliable fresh-keeping electrostatic field.

Embodiment 30

Figure 10:
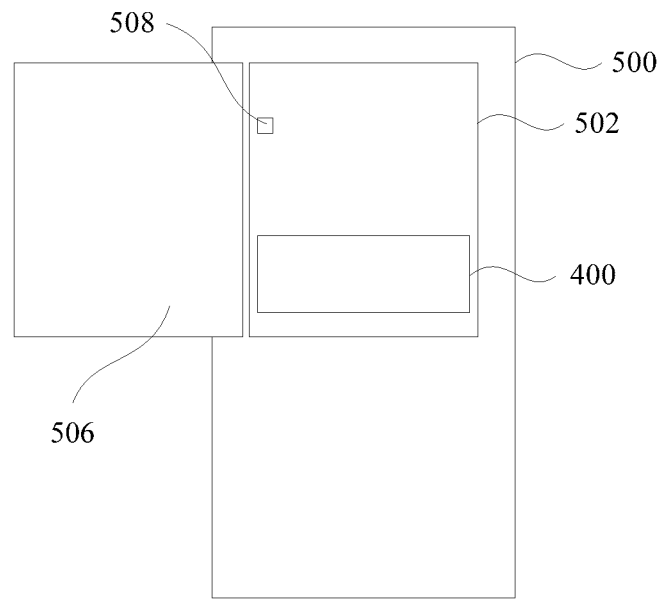
FIG. 10 is a schematic diagram showing a structure of a refrigerator according to an embodiment of the present disclosure.

FIG. 10 is a schematic diagram showing a structure of a refrigerator 500 according to an embodiment of the present disclosure. In some embodiment, the refrigerator 500 includes a refrigeration compartment 502 provided with a door body 506, and the sterilization apparatus 400 according to any of the embodiments described above, wherein the sterilization apparatus 400 is disposed in the refrigeration compartment 502.

In the embodiment herein, the refrigerator 500 includes the sterilization apparatus 400 as in any of the embodiments described above, and thus includes all the advantageous effects of the sterilization apparatus 400 as in any of the embodiments described above, which will not be described in detail herein.

In an embodiment, the sterilization apparatus 400 includes the first conductive layer 404 and the second conductive layer 408 that are arranged opposite to each other, wherein the second conductive layer 408 is provided with the first electret membrane 406, an electrostatic field is generated in the air gap between the first conductive layer 404 and the second conductive layer 408 by the first electret membrane 406, and air in the refrigeration compartment 502 is guided to pass through the electrostatic field by the fan 410, and the air is ionized and then diffused back into the refrigeration compartment 502, hence the sterilization is done.

Moreover, the refrigerator 500 includes the refrigeration compartment 502 and the door body 506, and the sterilization apparatus 400 is provided in the refrigeration compartment 502; when the door body 506 is closed, the refrigeration compartment 502 becomes a closed environment, and at this time, the sterilization apparatus 400 starts to work and can effectively kill bacteria in the refrigeration compartment 502 in a short time. As such, the sterilization treatment inside the refrigerator 500 is enabled, which is beneficial to retaining the freshness of food and avoiding off-flavors caused by bacterial growth for deodorization of the refrigerator 500.

Embodiment 31

In some embodiments of the present disclosure, as shown in FIG. 10, the refrigerator 500 further includes: a door sensor 508 provided on the door body 506 and/or in the refrigeration compartment 502, the door sensor 508 being configured to acquire a door opening signal and a door closing signal of the door body 506; and a controller connected to the door sensor 508 and the sterilization apparatus 400 for controlling the operation of the sterilization apparatus according to the door opening signal and the door closing signal.

In the embodiment herein, the door sensor 508 is provided on the refrigerator 500, for example, on the door body 506 or in the refrigeration compartment 502, and the door sensor 508 serves for acquiring the door opening signal and the door closing signal of the door body 506 of the refrigerator 500.

Herein, the door sensor 508 may be a micro-switch, a light sensor, or a Hall sensor, and the specific type of the door sensor 508 is not limited to the embodiments of the present disclosure.

In an embodiment, when the door of the refrigerator 500 is detected to be opened, since the refrigeration compartment 502 of the refrigerator 500 is in communication with the external environment now, the exchange of the air in the refrigeration compartment 502 with the external air may be accelerated if the fan continues operating, resulting in the loss of the cold energy and the massive invasion of external bacteria into the refrigeration compartment 502. Therefore, at this time, the sterilization apparatus 400 can be controlled to shut down.

When the door of the refrigerator 500 is detected to be closed, the external bacteria may invade into the refrigeration compartment 502 at the moment that the door is opened, and at this time, the sterilization apparatus 400 is controlled to automatically operate for a while, which can effectively kill the invasive bacteria in the refrigeration compartment 502 and enable the function of sterilizing, fresh keeping, and deodorizing.

In the embodiment herein, the door sensor 508 detects the opening or closing of the door body 506 of the refrigerator 500, and accordingly, the sterilization apparatus 400 is controlled to operate, which is conducive to improving the sterilizing and fresh-keeping effect of the refrigerator 500, while reducing the energy consumption.

Embodiment 32

In some embodiments of the present disclosure, as shown in FIG. 10, the refrigerator 500 further includes a display device connected to the controller and the sterilization apparatus 400 for displaying an operation state of the sterilization apparatus 400.

In the embodiment herein, the refrigerator 500 includes the display device, and the display device can display the operation state of the sterilization apparatus 400. When the sterilization apparatus 400 is in operation, the display device correspondingly displays a text message that reads "sterilization in progress", or a preset animation message; when the operation of the sterilization apparatus is finished, the display device can display text messages like "sterilization finished" and "fresh keeping in progress", and the user is well informed of the operation state of the sterilization apparatus 400 at any time and enjoys a good user experience.

Embodiment 33

Figure 11:
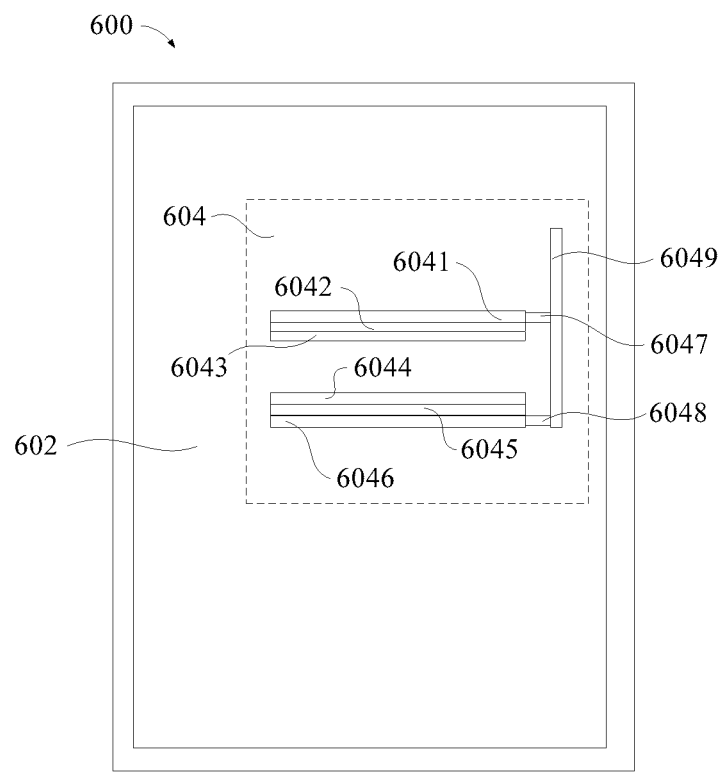
FIG. 11 is a structural diagram of the refrigeration apparatus according to an embodiment of the present disclosure.
Figure 12:
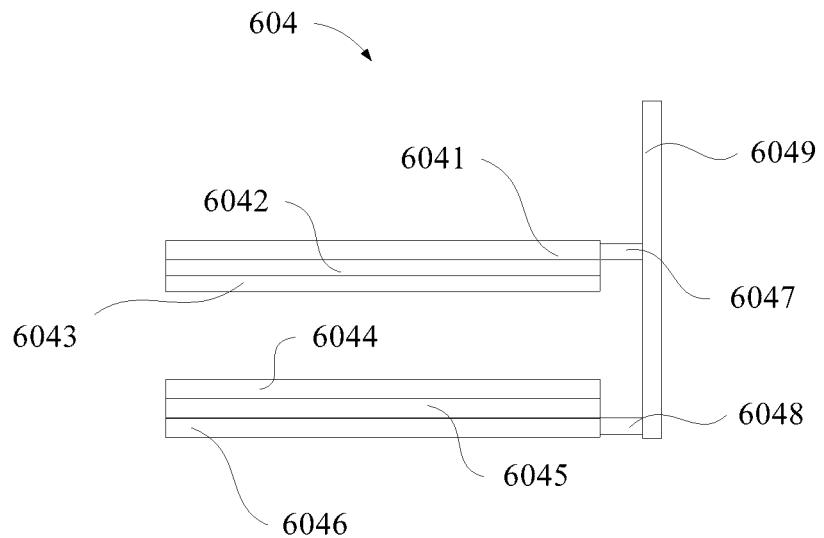
FIG. 12 is a structural diagram of the box assembly according to an embodiment of the present disclosure.

FIG. 11 is a structural diagram of the refrigeration apparatus 600 according to an embodiment of the present disclosure, and FIG. 12 is a structural diagram of the box assembly according to an embodiment of the present disclosure. In some embodiment, the refrigeration apparatus 600 includes: a refrigeration compartment 602; a box assembly 604 provided in the refrigeration compartment 602, wherein the box assembly 604 includes a first side wall 6041 and a second side wall 6046 that are arranged opposite to each other; an adjusting component 6049 for adjusting a distance between the first side wall 6041 and the second side wall 6046; a first conductive layer 6045 provided on the second side wall 6046; and a first electret membrane 6043 provided on the first side wall 6041, wherein the first electret membrane 6043 is between the first side wall 6041 and the first conductive layer 6045 and in parallel with the first conductive layer 6045.

In the embodiment herein, the refrigeration apparatus 600 can be a refrigerator, a freezer, a cold storage, or the like. The refrigeration apparatus includes therein the refrigeration compartment 602, and the refrigeration compartment 602 is kept at a constant and low temperature as set by a user to preserve the quality and freshness of materials.

The box assembly 604 is provided in the refrigeration compartment 602, and the distance between the first side wall 6041 and the second side wall 6046 of the box assembly 604 can be adjusted by the adjusting component 6049, that is, the adjusting component 6049 moves the first side wall 6041 closer to the second side wall 6046 to render a smaller air gap between the first side wall 6041 and the second side wall 6046; alternatively, the adjusting component 6049 moves the first side wall 6041 farther from the second side wall 6046 to render a larger air gap between the first side wall 6041 and the second side wall 6046.

Herein, the first side wall 6041 is provided with the first electret membrane 6043, the second side wall 6046 is provided with the first conductive layer 6045, and an electrostatic field can be generated between the first electret membrane 6043 and the first conductive layer 6045.

In an embodiment, the electret is a dielectric material capable of long-term storage of electric charges. Therefore, the metal electrode is provided on one side of the electret material matrix, and the metal electrode is electrically polarized under the influence of the charges of the electret, and an electrode is formed without an external power source. Accordingly, the electrodes formed by the electret membrane may affect the distribution of charges in the first conductive layer 6045, for electrically poling the first conductive layer 6045 as well. As such, an electrostatic field is generated between the first electret membrane 6043 and the first conductive layer 6045.

The intensity of the electrostatic field is related to the distance between the first electret membrane 6043 and the first conductive layer 6045. In an embodiment, when the distance between the first side wall 6041 and the second side wall 6046 decreases, the distance between the first electret membrane 6043 and the first conductive layer 6045 correspondingly decreases, and at this time, the intensity of the electrostatic field inside the box assembly 604 increases; in an intensified electrostatic field, the cell membrane of bacteria may show perforation polarization, and then suffer irreversible damage, resulting in the inactivation of bacteria. The box assembly 604 can thus be used as a sterilization apparatus.

As the distance between the first side wall 6041 and the second side wall 6046 increases, the electrostatic field intensity decreases, and the storage space between the first side wall 6041 and the second side wall 6046 expands. At this time, an electrostatic field with quite enough intensity is still maintained in the box assembly 604, and in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

In the embodiment herein, the adjusting component 6049 is provided to adjust the distance between the first side wall 6041 and the second side wall 6046 in the box assembly 604 and the box assembly 604 can serve as a sterilization apparatus or a fresh-keeping apparatus. A user can adjust the working mode of the box assembly 604 depending on actual requirements, catering to various requirements of the user, and accordingly, the refrigeration apparatus 600 has more function modes without additional function modules, for improving the user experience of the refrigeration apparatus 600.

Embodiment 34

In some embodiments of the present disclosure, as shown in FIG. 12, the box assembly 604 further includes a second conductive layer 6042 provided on the first side wall 6041 and between the first side wall 6041 and the first electret membrane 6043.

In the embodiment herein, the box assembly 604 further includes the second conductive layer 6042 provided on the first side wall 6041, and the second conductive layer 6042 is in parallel with the first conductive layer 6045, that is, opposite electrical shielding layers are formed by the second conductive layer 6042 in combination with the first conductive layer 6045, and the electrostatic field generated by the electret membrane is limited in a direction from the first side wall 6041 to the second side wall 6046.

Taking the first side wall 6041 as a top wall and the second side wall 6046 as a bottom wall as an example, since the top wall and the bottom wall are respectively provided with the first conductive layer 6045 and the second conductive layer 6042 that are arranged opposite and parallel to each other, the electrostatic field can be limited in a vertical direction from the first side wall 6041 to the second side wall 6046, i.e., between the top wall and the bottom wall. With the electrostatic field limited in one direction, a situation where electrostatic fields in multiple directions cancel each other is avoided, which is conducive to improving the intensity of the electrostatic field and rendering a better fresh-keeping effect of storing food or a better sterilization effect of the sterilization apparatus.

Embodiment 35

In some embodiments of the present disclosure, as shown in FIG. 12, the box assembly 604 further includes a second electret membrane 6044 provided on the first conductive layer 6045, wherein the second electret membrane 6044 is in parallel with the first electret membrane 6043, and the charge polarity of the second electret membrane 6044 is opposite to the charge polarity of the first electret membrane 6043.

In the embodiment herein, the second electret membrane 6044 may further be provided in the box assembly 604, and the second electret membrane 6044 may be on the second side wall 6046, opposite and in parallel with the first electret membrane 6043. Herein, the charge polarity of the second electret membrane 6044 is opposite to the charge polarity of the first electret membrane 6043, that is, when the second electret membrane 6044 is positively charged, the first electret membrane 6043 is negatively charged; when the second electret membrane 6044 is negatively charged, the first electret membrane 6043 is positively charged.

In the embodiment herein, the second electret membrane 6044 is in parallel with the first electret membrane 6043, and the charge polarity of the second electret membrane 6044 is opposite to the charge polarity of the first electret membrane 6043, and thus the intensity of the electrostatic field is effectively increased, for improving the fresh-keeping effect of the box assembly 604 to store food or the sterilization effect of the sterilization apparatus.

Embodiment 36

In some embodiments of the present disclosure, as shown in FIG. 11, the refrigeration apparatus 600 further includes a first ground line through which the first conductive layer 6045 is grounded, and a second ground line through which the second conductive layer 6042 is grounded.

In the embodiment herein, the refrigeration apparatus 600 includes the first ground line and the second ground line. The first ground line is connected to the first conductive layer 6045 and the first conductive layer 6045 is grounded. Similarly, the second ground line is connected to the second conductive layer 6042 and the second conductive layer 6042 is grounded. With the first conductive layer 6045 and the second conductive layer 6042 grounded, the first conductive layer 6045 and the second conductive layer 6042 have equal potentials, which can ensure that the electrostatic field generated by the electret membrane is limited in a fixed direction, advantageous for improving the intensity of the electrostatic field and rendering a better fresh-keeping effect of storing food.

In some embodiments, the first ground line is in communication with the second ground line, that is, the first conductive layer 6045 and the second conductive layer 6042 are commonly grounded, which can further increase the intensity of the electrostatic field.

In other embodiments, the first ground line and the second ground line are connected to a ground line of the refrigerator or a shell of the refrigerator.

Embodiment 37

In the embodiment herein, as shown in FIG. 12, the adjusting component 6049 includes a first connecting portion 6047 connected to the first side wall 6041, a second connecting portion 6048 connected to the second side wall 6046, and a drive member for driving the first connecting portion 6047 to move relative to the second connecting portion 6048 to move the first side wall 6041 closer to or away from the second side wall 6046.

In the embodiment herein, the adjusting component 6049 includes the first connecting portion 6047 and the second connecting portion 6048, wherein the first connecting portion 6047 is connected to the first side wall 6041 and the second connecting portion 6048 is connected to the second side wall 6046.

In an embodiment, in the box assembly 604, both the first side wall 6041 and the second side wall 6046 are configured to be movable. The box assembly 604 may include five side walls, wherein the first side wall 6041 and the second side wall 6046 are arranged opposite to each other. As can be appreciated, the box assembly 604 can further include fewer side walls, and in the case that the box assembly 604 includes only the first side wall 6041 and the second side wall 6046, the first side wall 6041 and the second side wall 6046 can optionally be top and bottom walls that sandwich something therebetween.

The first side wall 6041 and the second side wall 6046 are connected to the first connecting portion 6047 and the second connecting portion 6048, respectively, wherein the first side wall 6041 can be fixedly connected to the first connecting portion 6047 through welding, adhesion or integral forming, or can be detachably connected to the first connecting portion 6047 through bolts, snaps, etc.

The drive member may be a direct current motor, and a gear is provided at an output end of the direct current motor, and the gear drives a rack to move, for driving the first side wall 6041 and the second side wall 6046 to move closer to or away from each other.

The drive member may also be a linear motor having a driving end directly connected to one of the first and second connecting portions 6047 and 6048, for directly driving the first and second side walls 6041 and 6046 to move closer to or away from each other.

In the embodiment herein, the first connecting portion 6047 and the second connecting portion 6048 are driven by the drive member, for changing the distance between the first side wall 6041 and the second side wall 6046 and the box assembly 604 can serve as a sterilization apparatus or a fresh-keeping apparatus. A user can adjust the working mode of the box assembly 604 depending on actual requirements, catering to various requirements of the user, and accordingly, the refrigeration apparatus 600 has more function modes without additional function modules, for improving the user experience of the refrigeration apparatus 600.

Embodiment 38

In some embodiments of the present disclosure, as shown in FIG. 11, the refrigeration apparatus 600 further includes a controller connected to the drive member, wherein the controller is configured to control the first connecting portion 6047 to move relative to the second connecting portion 6048 to bring the first conductive layer 6045 closer to the second conductive layer 6042 in response to a sterilizing instruction, and control the first connecting portion 6047 to move relative to the second connecting portion 6048 to bring the first conductive layer 6045 away from the second conductive layer 6042 in response to a fresh-keeping instruction, for forming a receiving cavity between the first conductive layer 6045 and the second conductive layer 6042.

In the embodiment herein, upon the reception of the sterilizing instruction, the drive member is controlled to drive the first connecting portion 6047 to move towards the second connecting portion 6048, and the air gap between the first conductive layer 6045 and the second conductive layer 6042 gets smaller, and the box assembly 604 enters the sterilization mode.

Upon the reception of the fresh-keeping instruction, the drive member is controlled to drive the first connecting portion 6047 to move away from the second connecting portion 6048, and the air gap between the first conductive layer 6045 and the second conductive layer 6042 gets larger, and the box assembly 604 enters the fresh-keeping mode.

In an embodiment, assuming that the thickness of the electret membrane is s and the charges are distributed on the surface of the electret membrane with a density $\sigma$, the first conductive layer 6045 and the second conductive layer 6042 have induced charges on their surfaces under the influence of the electret charges. The density of the induced charges on the surface of the first conductive layer 6045 is $\sigma_0$, and the density of the induced charges on the surface of the second conductive layer 6042 is $\sigma_1$. $S_1$ is the distance between the first conductive layer 6045 and the second conductive layer 6042, $\varepsilon_r$ is the relative dielectric constant of the electret membrane, and $\varepsilon_{r1}$ is the relative dielectric constant of the air gap between the first conductive layer 6045 and the second conductive layer 6042. E is the intensity of the electrostatic field between the first conductive layer 6045 and the second conductive layer 6042.

According to the Gauss Theorem and Kirchhoff's Second Law, the following equation is obtained:

$$E = \frac{s\sigma}{\varepsilon_r \varepsilon_{r1} s + \varepsilon_r \varepsilon_{r1} s_1}$$

It can be seen that the intensity of the electrostatic field generated by the electret membrane is inversely related to the distance between the first conductive layer 6045 and the second conductive layer 6042.

The sterilization mode has higher requirements on the intensity of the electrostatic field, and an electrostatic field with higher intensity can better inactivate bacteria and improve the sterilization efficiency. Therefore, in the sterilization mode, the air gap distance between the first conductive layer 6045 and the second conductive layer 6042 is reduced, and the sterilization effect can be effectively improved.

However, an electrostatic field with lower intensity is enough for the fresh-keeping mode, and a larger air gap distance is conducive to storing more food materials. Therefore, in the fresh-keeping mode, the air gap distance between the first conductive layer 6045 and the second conductive layer 6042 can be appropriately increased.

In the embodiment herein, the distance between the first conductive layer 6045 and the second conductive layer 6042 is adjusted in different working modes to facilitate the switch between the sterilization and fresh-keeping modes, which is beneficial for improving the user experience.

Embodiment 39

In the embodiment herein, as shown in FIG. 11, the refrigeration apparatus 600 further includes a fan oriented towards the air gap between the first side wall 6041 and the second side wall 6046, wherein the controller is further configured to control the fan to begin operating in response to the sterilizing instruction.

In the embodiment herein, the refrigeration apparatus 600 further includes the fan having an outlet directed towards the air gap between the first side wall 6041 and the second side wall 6046. When the box assembly 604 is operated in the sterilization mode, the air in the refrigeration compartment 602 of the refrigerator is guided through the air gap between the first conductive layer 6045 and the second conductive layer 6042 by the fan, i.e., through the electrostatic field, hence the bacteria suspended in the air are inactivated in the electrostatic field, and thus effective sterilization is achieved.

Herein, the operation of the fan can further be controlled according to the state (i.e., being opened or closed) of the door body of the refrigeration compartment 602. In an embodiment, when the door of a refrigerator is detected to be opened, since the refrigeration compartment 602 of the refrigerator is in communication with the external environment now, the exchange of the air in the refrigeration compartment 602 with the external air may be accelerated if the fan continues operating, resulting in the loss of the cold energy and the massive invasion of external bacteria into the refrigeration compartment 602. Therefore, at this time, the fan can be controlled to stop.

When the door of the refrigerator is detected to be closed, the external bacteria may invade into the refrigeration compartment 602 at the moment that the door is opened, and at this time, the fan is controlled to automatically operate for a while at the maximum rate, which can effectively kill the invasive bacteria in the refrigeration compartment 602 and enable the function of sterilizing, fresh keeping, and deodorizing.

In some embodiments of the present disclosure, refrigeration apparatus 600 further includes a display control device connected to the controller for receiving the sterilizing instruction and the fresh-keeping instruction and displaying the working state of the box assembly.

In the embodiment herein, the display control device may be a touch screen or a combination of a display screen and switch keys, and the embodiments of the present disclosure do not limit the specific type of the display control device.

The display control device can receive the sterilizing instruction or the fresh-keeping instruction from a user and show the working state of the box assembly 604. In an embodiment, when the box assembly 604 operates in the sterilization mode, the display control device correspondingly displays a text message that reads "sterilization in progress" or an animation message; when the sterilization is finished, the words like "sterilization finished" and "fresh keeping in progress" can be displayed.

Similarly, in an embodiment, when the box assembly 604 operates in the fresh-keeping mode, the display control device correspondingly displays a text message that reads "fresh keeping in progress", as well as the elapsed time after entering the fresh-keeping mode, such as "in fresh keeping for 48 hours". As such, the user is well informed of the operation state of the refrigeration apparatus 600 at any time and enjoys a good user experience.

Embodiment 40

In some embodiments of the present disclosure, the first conductive layer and the second conductive layer are metal conductive layers.

In the embodiment herein, the first conductive layer and the second conductive layer can be formed as "electrodes", and the material thereof can be selected as a metal material and made into a metal conductive layer. Herein, the metal conductive layer can be an aluminum, copper, iron, or silver conductive layer, and in some embodiments, the metal material can be replaced by non-metallic conductive materials such as elemental carbon and isostructural forms of carbon. The specific material of the metal conductive layer is not limited to the embodiments of the present disclosure.

Embodiment 41

FIG. 1 shows a structure of an electret membrane 100 according to an embodiment of the present disclosure. In some embodiment, as shown in FIG. 1, the electret membrane 100 includes the electret material matrix 102, and the metal electrode 104 provided on one side of the electret material matrix 102 and attached to the electret material matrix 102.

In an embodiment herein, the electret is a dielectric material capable of long-term storage of electric charges. Therefore, the metal electrode 104 is provided on one side of the electret material matrix 102, and the metal electrode 104 is electrically polarized under the influence of the charges of the electret, and an electrode is formed without an external power source.

In an embodiment, because of the electric polarization of the electret membrane 100, the electret membrane 100 can form an electrostatic field in the storage unit; in the electrostatic field, food materials such as fruits and vegetables experience a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

Moreover, in the electrostatic field, the cell membrane of bacteria may show perforation polarization, and then suffer irreversible damage, resulting in the inactivation of bacteria. The fan can guide a certain range of air continuously into the electrostatic field, for effectively inactivating bacteria in the air passing through the air gap.

Given the embodiment herein, the electret membrane 100 can be electrically polarized without an external power source and form an electrostatic field that can simplify the electrostatic-field fresh-keeping and sterilizing structure and reduce the cost of generating the electrostatic field, which facilitates low-cost and highly reliable fresh-keeping and sterilizing effects through the electrostatic field.

Embodiment 42

In some embodiments of the present disclosure, an electret membrane is provided and applied to a storage unit within a refrigerator, such as a refrigerator drawer, and the refrigerator is provided with the function of fresh keeping through an electrostatic field without a powered electrode or corresponding power supply structure.

In an embodiment, the mechanisms of fresh keeping and sterilization through the electrostatic field are explained below.

The mechanism of fresh keeping is as follows.

(1) In the electrostatic field, there is a break of the potential balance between the interior and exterior of a cell membrane, and charged particles on both sides of the cell membrane move directionally, for generating a biological current; the biological current can effectively inhibit ATP (adenosine triphosphate), and thus the metabolism of cells can be effectively inhibited for fresh keeping.

(2) For fruits and vegetables, the activity of biological enzyme is further one of the main factors affecting the metabolism, and the structural changes of water molecules around enzyme protein will further cause changes in the physiological state of fruits and vegetables. The water molecules in the fruit and vegetable cells are polar molecules and exist in the form of a water molecule cluster formed by hydrogen bonding, and this water molecule cluster is a non-fixed dynamic structure. In the electrostatic field, the structure of the water molecule cluster will change, and then change how the water molecules are bonded to the enzyme protein, and the activity of the enzyme protein is reduced, which further inhibits the metabolism of fruits and vegetables for fresh keeping.

(3) Cellular respiration exists in the food such as fruits and vegetables, and it is mainly iron ions that serve as a transporter of electrons in the respiration. The electrostatic field affects the iron ions and then disturbs the metabolism associated with the iron ions, and the electron transfer in a respiration chain of the fruits or vegetables is blocked, and thus the respiration of the plant would be inhibited, for inhibiting the metabolism of the fruits or vegetables for fresh keeping.

The mechanism of sterilization is as follows.

Moreover, in the electrostatic field, the cell membrane of bacteria may show perforation polarization, and then suffer irreversible damage, resulting in the inactivation of bacteria. The fan can guide a certain range of air continuously into the electrostatic field, for effectively inactivating bacteria in the air passing through the air gap.

Further, the electret membrane is explained.

Figure 13:
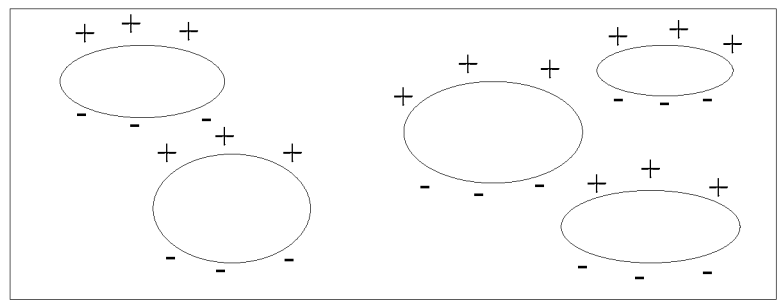
FIG. 13 is a schematic representation of a distribution of electric charges inside an electret.

Electrets are a class of dielectric materials capable of long-term storage of electric charges and showing a semi-permanent electrically polarized state. FIG. 13 is a schematic diagram of a distribution of electric charges inside an electret, and unlike triboelectrification, electric charges occur both at the surface and inside.

To confine the electrostatic field generated by the electret membrane to the storage space inside the drawer, a metal conductive layer may be added to the upper and lower surfaces of the drawer, and the metal conductive layer may form an electrode under the action of the electrostatic field to prevent the electric field from scattering.

In some embodiments, the upper and lower metal conductive layers (electrodes) may be short-circuited to the ground, for limiting the electrostatic field to a direction perpendicular to the electrodes.

Herein, in the case where a metal electrode is coated on the electret membrane through evaporation, there is no need to provide the metal conductive layer, or the metal conductive layer is provided only on the side opposite the electret membrane.

Figure 14:
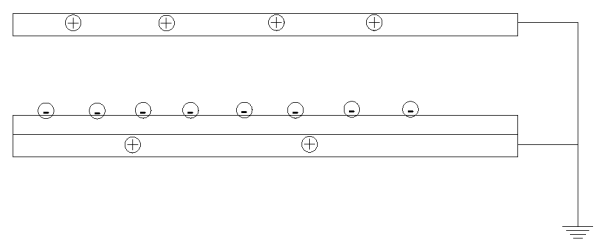
FIG. 14 is a first schematic diagram of an electret generating an electric field in a drawer.

FIG. 4 shows a structure of the box assembly, and FIG. 14 is a first schematic diagram of an electret generating an electric field in a drawer. Taking the electret membrane provided on the bottom of the drawer and the electret surface being negatively charged as an example, the distribution of the electrostatic field generated at this time is specifically described below.

In the electrostatic field of the electret membrane, induced charges of positive polarity are generated on an upper conductive layer (upper electrode), and the direction of the electrostatic field generated by the electret membrane is perpendicular to the surface and upward.

The distribution of the electrostatic field is similar in the case where the electret membrane is provided on the top of the drawer.

Herein, the intensity of the electrostatic field generated by the electret membrane is related to the quantity of charges stored in the electret and the distance between the upper and lower conductive layers (upper and lower electrodes).

Figure 15:
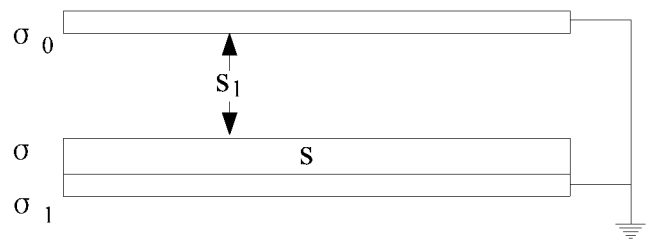
FIG. 15 is a second schematic diagram of the electret generating an electric field in the drawer.

In an embodiment, FIG. 15 is a second schematic diagram of the electret generating an electric field in the drawer. Herein, assuming that the electret membrane has a thickness s and charges are distributed on the surface of the electret membrane with a density $\sigma$, the upper electrode and the lower electrode have induced charges on their surfaces under the influence of the electret charges. The density of the induced charges on the surface of the upper electrode is $\sigma_0$, and the density of the induced charges on the surface of the lower electrode is $\sigma_1$. The distance between the upper electrode and the lower electrode is $S_1$, $\varepsilon_r$ is the relative dielectric constant of the electret membrane, and $\varepsilon_{r1}$ is the relative dielectric constant of the air gap between the upper electrode and the lower electrode. E is the intensity of the electrostatic field between the upper and lower electrodes.

According to the Gauss Theorem and Kirchhoff's Second Law, the following equation is obtained:

$$E = \frac{s\sigma}{\varepsilon_r \varepsilon_{r1} s + \varepsilon_r \varepsilon_{r1} s_1}$$

Wherein s is the thickness of the electret membrane, $\sigma$ is the area charge density of the electret membrane, $S_1$ is the distance between the upper electrode and the lower electrode, $\varepsilon_r$ is the relative dielectric constant of the electret membrane, $\varepsilon_{r1}$ is the relative dielectric constant of the air gap between the upper electrode and the lower electrode, and E is the intensity of the electrostatic field between the upper electrode and the lower electrode.

It can be seen from the above equation that in the storage space inside the drawer, the intensity of the electrostatic field increases with the increase of the density of the charges carried by the electret membrane on its surface and decreases with the increase of the distance between the upper and lower electrodes (which can be regarded as the height of the drawer). Moreover, the smaller the relative dielectric constant is of the electret membrane, the higher the intensity is of the electrostatic field in the storage space inside the drawer.

Therefore, the thickness of the electret membrane, the density of charges on the surface, and other parameters can be calibrated according to the height of the drawer employed, the required electrostatic field intensity and other indicators in a target refrigerator product to produce a desirable electret membrane.

Herein, the electret membrane includes an electret material matrix, and materials of the electret material matrix may include:

poly tetra fluoroethylene (PTEF), polypropylene (PP), and polyethylene (PE).

Among these, polyethylene specifically includes:

large-size crystal-structure high-density polyethylene (HDPE), microcrystalline high-density polyethylene, medium-density polyethylene (MDPE) and low-density polyethylene (LDPE).

The peak discharge temperatures of the electrets composed of above materials are shown in Table 1 below.

TABLE 1

| Material | Peak discharge temperature |
|---|---|
| PTEF | 230° C. |
| PP | 150° C. |
| Large-size crystal-structure HDPE | 150° C. |
| Microcrystalline HDPE | 130° C. |
| MDPE | 120° C. |
| LDPE | 85° C. |

The higher the peak discharge temperature is, the greater the capacity of the corresponding material to store charge is, so one or more materials can be selected as the material of the electret material matrix of the electret membrane in an overall consideration of costs and parameter requirements of the electret membrane.

Figure 16:
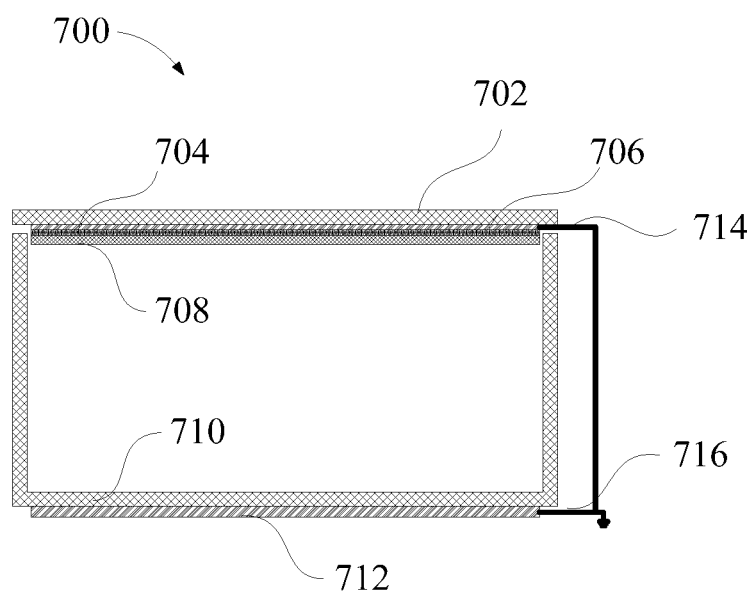
FIG. 16 shows a sectional view of a refrigerator drawer.

FIG. 16 shows a sectional view of a refrigerator drawer, and as shown in FIGS. 4 and 16, the refrigerator drawer includes an upper cover plate 702, a first electret membrane 704, a second conductive layer 706, a first side wall 708, a second side wall 710, a first conductive layer 712, a second ground line 714, and a first ground line 716.

Herein, the electret membrane is mounted inside a packaging plate, and a first electric field shielding plate is provided on the back surface of the electret membrane. A first ground wire is provided on the first electric field shielding plate, and the electret membrane and the first electric field shielding plate are attached to each other and mounted inside the packaging plate. The packaging plate and an upper panel are mounted on a support of the upper panel of the drawer.

A further second electric field shielding plate is provided in a distance from the plane of the electret membrane and opposite the electret membrane, and a second ground wire is provided on the second electric field shielding plate. The first electric field shielding plate is in communication with the second electric field shielding plate via the wire, and they are connected to a refrigerator ground line.

The shielding plates are mounted on the support plate 218, the two shielding plates and the electret membrane are arranged parallel and opposite to each other, the drawer is provided in the space between the shielding plates, and the storage space of the drawer is within the enclosure of the two shielding plates.

The electret membrane generates a spatial radiation electric field, and a uniform electric field with parallel electric field lines can be formed between the two shielding plates by configuring the two shielding plates. The shielding plates can limit the electric field between the two shielding plates and form a stronger electric field in the desirable space, which is conducive to improving the fresh-keeping effect.

To further increase the electric field intensity, the lower shielding plate may be replaced with a combination of an electret membrane of opposite polarity to the upper electret membrane and a shielding plate.

In addition, the electric field intensity is inversely related to the distance between the shielding plates, and one of the shielding plates is designed to be movable up and down structurally, and in use, the shielding plate is automatically moved upon an identification of the variety and quantity of food materials in storage to render the effect of intensifying the electric field.

In an embodiment, an adjusting component can be provided within the refrigerator drawer 700 to adjust the distance between the upper and lower shielding plates. The adjusting component can be a DC motor, wherein a gear is provided at an output end of the DC motor, and the gear drives a rack to move, for driving the upper and lower shielding plates to move closer to or away from each other, to adjust the intensity of the electrostatic field and the storage space in the refrigerator drawer 700.

The adjusting component can further be a linear motor having a drive end directly connected to either the upper or lower shielding plate to directly drive one of the upper and lower shielding plates closer to or away from the other of the upper and lower shielding plates, to adjust the electrostatic field intensity and storage space within the refrigerator drawer 700.

When the gap between the two shielding plates is small enough, the electric field intensity keeps increasing, and when the electric field intensity reaches 40 KV/m, the high-intensity electric field has a sterilization effect, that is, the gas is driven to flow between the shielding plates for sterilization.

In an embodiment, a fan may be provided on one side of the drawer 700 of the refrigerator, and the fan may be located inside or outside the drawer. When the fan is provided outside the drawer, a vent can be configured at a corresponding position.

The adjusting component adjusts the air gap distance between the upper shielding plate and the lower shielding plate. When the air gap distance between the upper shielding plate and the lower shielding plate is small enough to render the electric field intensity in the air gap to be greater than or equal to 40 KV/m, the fan can be started, and the air in the refrigeration compartment can be guided to pass through the air gap between the upper shielding plate and the lower shielding plate. In the high-intensity electric field in the air gap, the cell membrane of bacteria may show perforation polarization, and then suffer irreversible damage, resulting in the inactivation of bacteria. The fan can guide a certain range of air continuously into the electrostatic field, for effectively inactivating bacteria in the air passing through the air gap.

The sterilization process can effectively inhibit the quantity of bacteria in the refrigerator compartment, prevent the food from going bad because of bacteria growth, and avoid the occurrence of odor caused by bacterial activity, which is beneficial to ensure the health of users.

When the refrigerator drawer 700 is used as a sterilization apparatus, the sterilization process can be linked with the door body of the refrigeration compartment. In an embodiment, a door sensor for acquiring a door opening signal of the refrigerator door body and a door closing signal of the refrigerator door body can be provided, and the door sensor may be specifically provided on the door body or in the refrigeration compartment.

Herein, the door sensor can be a micro-switch, a light sensor or a Hall sensor, and the embodiments of the present disclosure do not limit the specific type of the door sensor.

In an embodiment, when the door of the refrigerator is detected to be opened, since the refrigeration compartment of the refrigerator is in communication with the external environment now, the exchange of the air in the refrigeration compartment with the external air may be accelerated if the fan continues operating, resulting in the loss of the cold energy and the massive invasion of external bacteria into the refrigeration compartment. Therefore, at this time, the sterilization apparatus can be controlled to shut down.

When the door of the refrigerator is detected to be closed, the external bacteria may invade into the refrigeration compartment at the moment that the door is opened, and at this time, the sterilization apparatus is controlled to automatically operate for a while, which can effectively kill the invasive bacteria in the refrigeration compartment and enable the function of sterilizing, fresh keeping, and deodorizing.

In the embodiment herein, the state (i.e., being opened or closed) of the refrigerator door body is detected by the door sensor, and correspondingly, the sterilization apparatus is controlled to operate, which is conducive to improving the sterilization and fresh-keeping effect of the refrigerator while reducing energy consumption.

In the description of the present disclosure, the term "plurality" means two or more. Unless expressly defined otherwise, the terms like "upper" and "lower" indicate orientations or positional relationships based on the drawings for purposes of describing the present disclosure and simplifying the description only and are not intended to indicate or imply that the referenced devices or parts must have a particular orientation, be constructed and operated in a particular orientation; therefore, these terms shall not be construed as limiting the present disclosure. The terms like "connected", "mounted", and "fixed" are to be construed broadly, for example, being "connected" may be in fixed connection, detachable connection, or integral connection, either in direct connection or indirect connection through an intermediary. For a person of ordinary skill in the art, the specific meaning of the above terms in the present disclosure can be understood according to specific situations.

In the description of the present disclosure, the terms like "an embodiment", "some embodiments", and "specific embodiments" mean that a particular feature, structure, material, or characteristic described in connection with the embodiment or example is included in at least one embodiment or example of the present disclosure. In this application, illustrative use of the above terms do not necessarily refer to the same embodiment or example. Furthermore, the particular features, structures, materials, or characteristics described may be combined in any suitable manner in any one or more embodiments or examples.

While the foregoing is directed to the preferred embodiments of the present disclosure, other and further embodiments of the present disclosure may be devised without departing from the basic scope thereof, and the scope thereof is defined by the appended claims. All changes, equivalents, improvements, and the like, that come within the spirit and scope of the application are intended to be embraced therein.

What is claimed is:

1. A storage apparatus comprising a box assembly, wherein the box assembly comprises:
   a first side wall;
   a second side wall opposite to the first side wall;
   a first conductive layer provided on the second side wall;
   a first electret membrane provided on the first side wall, the first electret membrane being between the first side wall and the first conductive layer and in parallel with the first conductive layer;
   an adjusting component for adjusting an intensity of an electric field between the first conductive layer and the first electret membrane;
   a second conductive layer provided on the first side wall and between the first side wall and the first electret membrane; and
   a second electret membrane provided on the first conductive layer, wherein the second electret membrane is in parallel with the first electret membrane, and a charge polarity of the second electret membrane is opposite to a charge polarity of the first electret membrane.

2. The storage apparatus according to claim 1, further comprising:
   a first ground line through which the first conductive layer is grounded; and
   a second ground line through which the second conductive layer is grounded.

3. The storage apparatus according to claim 1, wherein the adjusting component comprises:
   a first connecting portion connected to the first side wall;
   a second connecting portion connected to the second side wall; and
   a drive member for driving the first connecting portion to move relative to the second connecting portion to move the first side wall closer to or away from the second side wall.

4. The storage apparatus according to claim 3, further comprising:
   a controller connected to the drive member, wherein the controller is configured to:
   control the first connecting portion to move relative to the second connecting portion to bring the first conductive layer closer to the second conductive layer in response to a sterilizing instruction, and
   control the first connecting portion to move relative to the second connecting portion to bring the first conductive layer away from the second conductive layer in response to a fresh-keeping instruction, for forming a receiving cavity between the first conductive layer and the second conductive layer.

5. The storage apparatus according to claim 4, further comprising:
   a fan oriented towards an air gap between the first side wall and the second side wall,
   wherein the controller is further configured to control the fan to begin operating in response to the sterilizing instruction.

6. The storage apparatus according to claim 4, further comprising:
   display control device connected to the controller for receiving the sterilizing instruction and the fresh-keeping instruction and displaying a working state of the box assembly.

7. The storage apparatus according to claim 1, wherein the first conductive layer and the second conductive layer are metal conductive layers.

8. The storage apparatus according to claim 1, wherein each of the first electret membrane and the second electret membrane comprises:
   an electret material matrix;
   a metal electrode provided on one side of the electret material matrix and adhered to the electret material matrix.

9. The storage apparatus according to claim 8, wherein the first and second electret membranes further comprises:
   a hydrophobic layer, provided on an outer surface of the electret material matrix and/or the metal electrode.

10. The storage apparatus according to claim 8, wherein a material of the electret material matrix comprises at least one of:

poly tetra fluoroethylene, polypropylene, polyethylene, tetrafluorethylene-hexafluoropropylene, fluorinated ethylene propylene copolymer, silicon dioxide, aluminium oxide, magnesium dioxide, and silicon tetranitride.

* * * * *